United States Patent
Li

(10) Patent No.: US 12,016,007 B2
(45) Date of Patent: *Jun. 18, 2024

(54) DATA SCHEDULING METHOD AND APPARATUS

(71) Applicant: HUAWEI TECHNOLOGIES CO., LTD., Shenzhen (CN)

(72) Inventor: Yunbo Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/163,434

(22) Filed: Feb. 2, 2023

(65) Prior Publication Data

US 2023/0180210 A1 Jun. 8, 2023

Related U.S. Application Data

(63) Continuation of application No. 17/169,832, filed on Feb. 8, 2021, now Pat. No. 11,589,368, which is a
(Continued)

(30) Foreign Application Priority Data

Aug. 10, 2018 (CN) .......................... 201810910924.3

(51) Int. Cl.
*H04W 72/50* (2023.01)
*H04W 72/121* (2023.01)
(Continued)

(52) U.S. Cl.
CPC ..... *H04W 72/121* (2013.01); *H04W 72/1273* (2013.01); *H04W 72/535* (2023.01); *H04W 74/0833* (2013.01)

(58) Field of Classification Search
CPC ........... H04W 72/121; H04W 72/1273; H04W 72/535; H04W 74/0833; H04W 74/0808;
(Continued)

(56) References Cited

U.S. PATENT DOCUMENTS 9,854,607 B1 12/2017 Chu et al.
10,735,151 B2 8/2020 Kim et al.
(Continued)

FOREIGN PATENT DOCUMENTS

CN 102160447 A 8/2011
CN 105557048 A 5/2016
(Continued)

OTHER PUBLICATIONS

Fang et al. "Efficient utilisation of extended bandwidth in 802.11ac with and without overlapping basic service sets." Electronics Letters. Nov. 20, 2014. vol. 50, No. 24. pp. 1884-1886.

*Primary Examiner* — Un C Cho
*Assistant Examiner* — Lalita W Pace
(74) *Attorney, Agent, or Firm* — Maier & Maier, PLLC

(57) ABSTRACT

A data scheduling method and apparatus. The method includes: allocating, by an access point (AP), at least one of a plurality of primary channels to each of a plurality of stations (STAs), where active access is forbidden on the plurality of primary channels; and synchronously scheduling, by the AP, a STA on a channel including at least one idle primary channel, where the synchronously scheduled STA is a STA allocated to the at least one idle primary channel, and the at least one idle primary channel is at least one of the plurality of primary channels. The AP sets the plurality of primary channels, so that the AP can flexibly schedule the station by using the idle primary channel. This avoids a problem caused by setting only one primary channel, thereby improving data transmission efficiency.

18 Claims, 5 Drawing Sheets

Related U.S. Application Data continuation of application No. PCT/CN2019/083206, filed on Apr. 18, 2019.

(51) Int. Cl.
*H04W 72/1273* (2023.01)
*H04W 74/0833* (2024.01)

(58) Field of Classification Search
CPC . H04W 74/0816; H04W 84/12; H04W 74/04; H04W 72/1221; H04W 72/1263; H04W 72/12; H04W 72/1205; H04W 72/1257; H04W 72/1268; H04W 72/02; H04W 72/04; H04W 72/1278; H04W 74/0836; H04W 74/0838

See application file for complete search history.

(56) References Cited

U.S. PATENT DOCUMENTS

| | | |
|---|---|---|
| 10,939,476 B1 | 3/2021 | Chu et al. |
| 2011/0096747 A1 | 4/2011 | Seok |
| 2014/0112273 A1 | 4/2014 | Aboul-Magd et al. |
| 2015/0163769 A1 | 6/2015 | Lee et al. |
| 2015/0359008 A1 | 12/2015 | Wang et al. |
| 2017/0311325 A1 | 10/2017 | Cariou et al. |
| 2017/0338935 A1 | 11/2017 | Ahn et al. |
| 2018/0255570 A1 | 9/2018 | Patil et al. |
| 2019/0132724 A1 | 5/2019 | Asterjadhi et al. |
| 2019/0182863 A1 | 6/2019 | Chu et al. |
| 2019/0222376 A1 | 7/2019 | Wu et al. |

FOREIGN PATENT DOCUMENTS

| | | | |
|---|---|---|---|
| CN | 106658725 A | 5/2017 | |
| CN | 107005302 A | 8/2017 | |
| CN | 107113829 A | 8/2017 | |
| CN | 107535006 A | 1/2018 | |
| WO | 2014112707 A1 | 7/2014 | |
| WO | 2014183401 A1 | 11/2014 | |
| WO | WO-2014183401 A1 * | 11/2014 | ............ H04W 74/00 |
| WO | 2016078092 A1 | 5/2016 | |
| WO | 2016082216 A1 | 6/2016 | |

* cited by examiner

| PCH 1 | | | PCH 2 | | | PCH 3 | | | PCH 4 | | |
|---|---|---|---|---|---|---|---|---|---|---|---|
| 20 MHz | | | 20 MHz | | | 20 MHz | | | 20 MHz | | |
| 40 MHz | | | 40 MHz | | | 40 MHz | | | 40 MHz | | |
| 80 MHz | | | | 80 MHz | | | 80 MHz | | | 80 MHz | |
| 160 MHz | | | | | | 160 MHz | | | | | |
| 320 MHz | | | | | | | | | | | |
FIG. 4
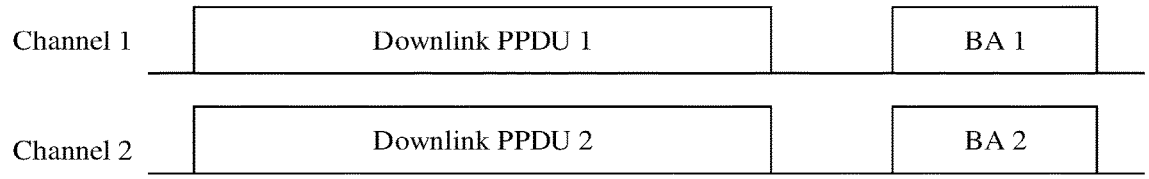
FIG. 5
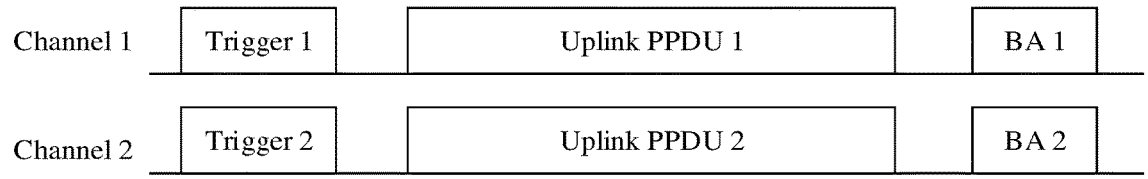
FIG. 6
| PCH 1 | | | PCH 2 | | | PCH 3 | | | PCH 4 | | |
|---|---|---|---|---|---|---|---|---|---|---|---|
| 20 MHz | | | 20 MHz | | | 20 MHz | | | 20 MHz | | |
| 40 MHz | | | 40 MHz | | | 40 MHz | | | 40 MHz | | |
| 80 MHz | | | | 80 MHz | | | 80 MHz | | | 80 MHz | |
| 160 MHz of a BSS 1 and a BSS 2 | | | | | | 160 MHz of a BSS 3 and a BSS 4 | | | | | |
| 320 MHz of the BSS 1, the BSS 2, the BSS 3, and the BSS 4 | | | | | | | | | | | |
FIG. 7

DATA SCHEDULING METHOD AND APPARATUS

CROSS-REFERENCE TO RELATED APPLICATIONS

This application is a continuation of U.S. patent application Ser. No. 17/169,832, filed on Feb. 8, 2021, which is a continuation of International Application No. PCT/CN2019/083206, filed on Apr. 18, 2019. The International Application claims priority to Chinese Patent Application No. 201810910924.3, filed on Aug. 10, 2018. All of the aforementioned patent applications are hereby incorporated by reference in their entireties.

TECHNICAL FIELD

The embodiments relate to the communications field, a data scheduling method, and an apparatus.

BACKGROUND

The Institute of Electrical and Electronics Engineers (IEEE) 802.11 is one of mainstream wireless access standards and has been widely used in commercial applications over the past 10 years.

In the IEEE 802.11a standard, only a 20 MHz bandwidth is supported, and the bandwidth is continuously increased during evolution of subsequent standards. The IEEE 802.11n standard supports a maximum bandwidth of 40 MHz, and the IEEE 802.11ac/ax standard supports a maximum bandwidth of 160 MHz. However, to ensure backwards compatibility, there is a unique primary 20 MHz channel regardless of the bandwidth. Regardless of a bandwidth in which an access point (AP) and a station (STA) send data, the primary 20 MHz channel needs to be included. As a result, when the primary 20 MHz channel is busy, all other idle secondary channels cannot be used; and consequently, system efficiency is greatly reduced. Currently, a 320 MHz bandwidth is proposed in a next-generation Wi-Fi standard. If an existing architecture continues to be used, a bottleneck problem caused by the primary 20 MHz channel will be further aggravated.

Therefore, improving efficiency of data transmission between the AP and the STA has become a problem that needs to be urgently resolved.

SUMMARY

The embodiments provides a data scheduling method and apparatus. According to the method, data transmission efficiency can be improved.

According to a first aspect, a data scheduling method is provided. The method includes:
  allocating, by an access point (AP), at least one of a plurality of primary channels to each of a plurality of stations (STAs or STA when singular), where active access is forbidden on the plurality of primary channels; and
  synchronously scheduling, by the AP, an STA on a channel including at least one idle primary channel, where the synchronously scheduled STA is a STA allocated to the at least one idle primary channel, and the at least one idle primary channel is at least one of the plurality of primary channels.

In this embodiment, the AP sets the plurality of primary channels in a system bandwidth. The AP allocates at least one of the plurality of primary channels to each of the plurality of STAs, where active access is forbidden on the plurality of primary channels. The AP synchronously schedules the STA on the channel including the at least one idle primary channel in the plurality of primary channels, where the synchronously scheduled STA is the STA allocated to the idle primary channel. In this embodiment, the AP sets the plurality of primary channels, so that the AP can flexibly schedule the station by using the idle primary channel. This avoids a problem caused by setting only one primary channel in the prior art, thereby improving data transmission efficiency.

In addition, in this embodiment, the AP schedules the STAs in a unified manner, so that it is ensured that only uplink transmission or downlink transmission can be performed at a same time, and a conflict caused when both uplink transmission and downlink transmission are performed at the same time can be avoided.

With reference to some implementations of the first aspect, a maximum bandwidth corresponding to each of the plurality of primary channels is a maximum bandwidth supported by the AP.

In this embodiment, a maximum bandwidth mode corresponding to each primary channel may be the maximum bandwidth (namely, a maximum system bandwidth) supported by the AP. Therefore, in this embodiment, a maximum bandwidth of a presentation protocol data unit (PPDU) sent by using a primary channel is not decreased because the plurality of primary channels are introduced. In other words, for another primary channel, the primary channel is a secondary channel. When a channel bandwidth including the plurality of primary channels is idle, the AP may choose to send a PPDU corresponding to a primary channel, or may send a plurality of PPDUs, where each PPDU corresponds to a primary channel. When a large-bandwidth PPDU (that is, a bandwidth of the PPDU includes the plurality of primary channels) is sent, the large-bandwidth PPDU may provide a higher peak rate for the STAs, where the STAs allocated to different primary channels may use the channel in time division. When the AP sends the plurality of PPDUs concurrently, although a peak rate of a STA corresponding to each PPDU is reduced, the plurality of STAs on the plurality of primary channels can simultaneously use the channel. This helps reduce a latency. Thus, during actual application, the AP may flexibly perform scheduling in the foregoing manner based on an actual requirement. This embodiment is not limited thereto.

It can be understood that, in this embodiment, the maximum bandwidth supported by the AP is not limited to 320 MHz. For example, the maximum bandwidth supported by the AP may be less than 320 MHz, for example, 160 MHz. Alternatively, the maximum bandwidth supported by the AP may be greater than 320 MHz, for example, 640 MHz. This embodiment is not limited thereto.

It can be noted that, before the STAs associate with the AP, the AP does not know existence of the STAs; and consequently, the AP cannot schedule the STAs. In this embodiment, active access of the stations is forbidden on the primary channels. Therefore, the AP needs to associate with the STAs, so that the AP then can schedule the STAs.

With reference to some implementations of the first aspect, before the AP synchronously schedules the STA on the channel including the at least one idle primary channel in the plurality of primary channels, the method further includes:
  accepting, by the AP, association performed by the plurality of STAs at least one of:

an uplink orthogonal frequency division multiplexing random access (UORA);

an enhanced distributed channel access (EDCA) within a random contention period allocated by the AP; or through another AP, where the another AP and the AP belong to a same device.

Thus, in an implementation, the plurality of STAs may send uplink frames to the AP in the UORA, to associate with the AP.

Alternatively, in another implementation, the AP may allocate some random contention periods. For example, the plurality of STAs are allowed to perform EDCA within the random contention periods, and EDCA is forbidden within another time period. In this way, the STAs may send uplink frames within EDCA time periods, to associate with the AP.

Alternatively, in another implementation, the plurality of STAs may associate with the AP through the another AP, where the another AP and the AP belong to the same device (a radio access device).

It can be noted that, in this embodiment, one radio access device may have one AP or a plurality of APs. The radio access device may support multiple bands, and each band may have one or more channels. When the radio access device has the plurality of APs, the plurality of APs belonging to a same radio access device are sometimes referred to as co-located APs, and a plurality of basic service sets (BSSs or BSS when singular) corresponding to the plurality of APs are referred to as co-located BSSs. Different APs may correspond to different channels. In this embodiment, the plurality of STAs may associate with the AP through the another AP that belongs to the same radio access device as the AP. The two APs may work on one band or may work on two bands. The bands may include, but are not limited to, bands of 2.4 GHz, 5 GHz, 6 GHz, and 60 GHz. This embodiment is not limited thereto. The another AP allows random access of the STAs. For example, the another AP allows random access of the STAs, so that the plurality of STAs can associate with the AP through the another AP. Thus, for a frame format and a message of a frame sent when the STAs associate with the AP through the another AP, refer to descriptions in the IEEE 802.11-2016 standard. Details are not described herein.

It can be noted that, in this embodiment, the STAs may alternatively associate with the AP in another manner. This embodiment is not limited thereto. For example, the STAs may alternatively associate with the AP in a DCF.

For example, in this embodiment, the STAs need to first associate with the AP. After association is completed, the AP allocates one or more primary channels (for example, the primary channel is a primary 20 MHz channel) to each STA. Finally, the STAs associated with the AP form a STA group in each primary 20 MHz channel. Each group of STAs may focus only on a primary 20 MHz channel allocated to the group of STAs, and the STAs may not receive a PPDU that is not sent by using the allocated primary 20 MHz channel.

Optionally, in this embodiment, the AP may further send a beacon frame on each primary 20 MHz channel, so that the STAs on each primary 20 MHz channel can perform clock synchronization and update BSS parameters.

In this embodiment, active access is forbidden on the primary channels, and both uplink transmission and downlink transmission are scheduled by the AP. Therefore, in this embodiment, it can be avoided that uplink transmission is performed on a primary 20 MHz channel while downlink transmission is performed on another 20 MHz channel.

Because the AP schedules the STAs in a unified manner, in this embodiment, the AP may support a plurality of primary 20 MHz channels by using a single transceiver. During actual application, because the AP schedules the STAs in the unified manner, the AP may choose to ignore uplink random access information sent by the STAs and does not respond to the STAs.

With reference to some implementations of the first aspect, that the AP synchronously schedules the STA on the channel including the at least one idle primary channel in the plurality of primary channels includes:

sending, by the AP on the channel including the at least one idle primary channel, to the STA allocated to the idle primary channel, one downlink protocol data unit PPDU, or a plurality of downlink PPDUs simultaneously, where each PPDU occupies at least one primary channel;

or sending, by the AP on the channel including the at least one idle primary channel, to the STA allocated to the idle primary channel, one trigger frame, or a plurality of trigger frames simultaneously, where a PPDU in which each trigger frame is located occupies at least one primary channel, and the trigger frame is used to trigger the STA allocated to the idle primary channel to send one uplink PPDU or simultaneously send a plurality of uplink PPDUs; and receiving, by the AP, the uplink PPDU, or the plurality of uplink PPDUs simultaneously.

For example, the AP may schedule a corresponding STA by including a STA identifier in at least one user information (info) field in the trigger frame. Each user information field may carry a STA identifier. This embodiment is not limited thereto.

It can be understood that, in this embodiment, the channel including the at least one idle primary channel may include only the at least one idle primary channel, or may include the at least one idle primary channel, another primary channel, and a secondary channel. This embodiment is not limited thereto.

The following describes a solution in which the AP determines the idle primary channel and schedules the STA by using the channel including the at least one idle primary channel in this embodiment.

For example, during actual application, the AP executes backoff. When determining that the primary channel is in an idle state, the AP synchronously sends one or more downlink PPDUs on the channel including the at least one idle primary channel, or synchronously schedules one or more uplink PPDUs by using the trigger frame.

With reference to some implementations of the first aspect, the plurality of primary channels correspond to one backoff counter, after a continuous idle time period of a first primary channel in the plurality of primary channels reaches an AIFS, if the first primary channel continues to be idle, the backoff counter is decreased by 1 for each idle slot, and when a value of the backoff counter is 0, the first primary channel is in the idle state, where the first primary channel is any one of the plurality of primary channels.

With reference to some implementations of the first aspect, the method further includes:

when the AP sends, on the channel including the at least one idle primary channel, N pieces of data to the STA allocated to the idle primary channel, if at least one piece of data is successfully sent, updating, by the AP, a window value of the backoff counter to a preset minimum window value, or if all the N pieces of data fail to be sent, updating, by the AP, a window value of the backoff counter to a smaller one of a preset maximum window value and a value twice a current window value plus 1, where the data is the downlink PPDU or the trigger frame, and N is an integer greater than or equal to 1.

With reference to some implementations of the first aspect, each of the plurality of primary channels corresponds to one backoff counter, after a continuous idle time period of a second primary channel in the plurality of primary channels reaches an AIFS, if the second primary channel continues to be idle, a second backoff counter corresponding to the second primary channel is decreased by 1 for each idle slot, and when a value of the second backoff counter is 0, the second primary channel is in the idle state, where the second primary channel is any one of the plurality of primary channels.

With reference to some implementations of the first aspect, each of the plurality of primary channels corresponds to one backoff counter, after a continuous idle time period of a third primary channel in the plurality of primary channels reaches an AIFS, if the third primary channel continues to be idle, a third backoff counter corresponding to the third primary channel is decreased by 1 for each idle slot, and after a value of the third backoff counter is 0, when a value of a fourth backoff counter corresponding to a fourth primary channel in the plurality of primary channels other than the third primary channel is backed off to 0, the fourth primary channel is in the idle state, where the third primary channel and the fourth primary channel are any two of the plurality of primary channels.

With reference to some implementations of the first aspect, the method further includes:
when the AP sends, on the channel including the at least one idle primary channel, N pieces of data to the STA allocated to the idle primary channel, if at least one piece of data is successfully sent, updating, by the AP, a window value of a backoff counter corresponding to a primary channel occupied by the N pieces of data to a preset minimum window value, or if all the N pieces of data fail to be sent, updating, by the AP, a window value of a backoff counter corresponding to a primary channel occupied by the N pieces of data to a smaller one of a preset maximum window value and a value twice a current window value plus 1, where the data is the downlink PPDU or the trigger frame, and N is an integer greater than or equal to 1;
or
when the AP sends, on the channel including the at least one idle primary channel, N pieces of data to the STA allocated to the idle primary channel, if at least one piece of data is successfully sent, updating, by the AP, a window value of a backoff counter corresponding to a primary channel occupied by the N pieces of data to a preset minimum window value, or if all the N pieces of data fail to be sent, updating, by the AP, a window value of a backoff counter whose value is 0 and that corresponds to a primary channel occupied by the N pieces of data to a smaller one of a preset maximum window value and a value twice a current window value plus 1, where the data is the downlink PPDU or the trigger frame, and N is an integer greater than or equal to 1;
or
when the AP sends, on the channel including the at least one idle primary channel, N pieces of data to the STA allocated to the idle primary channel, if at least one piece of data is successfully sent, updating, by the AP, a window value of a backoff counter whose value is 0 and that corresponds to a primary channel occupied by the N pieces of data to a preset minimum window value, or if all the N pieces of data fail to be sent, updating, by the AP, a window value of a backoff counter corresponding to a primary channel occupied by the N pieces of data to a smaller one of a preset maximum window value and a value twice a current window value plus 1, where the data is the downlink PPDU or the trigger frame, and N is an integer greater than or equal to 1.

With reference to some implementations of the first aspect, the method further includes:
when the AP sends, on the channel including the at least one idle primary channel, N pieces of data to the STA allocated to the idle primary channel, if one piece of data is successfully sent, updating, by the AP, a window value of a backoff counter corresponding to a primary channel occupied by the piece of data to a preset minimum window value, or if one piece of data fails to be sent, updating, by the AP, a window value of a backoff counter corresponding to a primary channel occupied by the piece of data to a smaller one of a preset maximum window value and a value twice a current window value plus 1, where the data is the downlink PPDU or the trigger frame, and N is an integer greater than or equal to 1;
or
when the AP sends, on the channel including the at least one idle primary channel, N pieces of data to the STA allocated to the idle primary channel, if one piece of data is successfully sent, updating, by the AP, a window value of a backoff counter corresponding to a primary channel occupied by the piece of data to a preset minimum window value, or if one piece of data fails to be sent, updating, by the AP, a window value of a backoff counter whose value is 0 and that corresponds to a primary channel occupied by the piece of data to a smaller one of a preset maximum window value and a value twice a current window value plus 1, where the data is the downlink PPDU or the trigger frame, and N is an integer greater than or equal to 1;
or
when the AP sends, on the channel including the at least one idle primary channel, N pieces of data to the STA allocated to the idle primary channel, if one piece of data is successfully sent, updating, by the AP, a window value of a backoff counter whose value is 0 and that corresponds to a primary channel occupied by the piece of data to a preset minimum window value, or if one piece of data fails to be sent, updating, by the AP, a window value of a backoff counter whose value is 0 and that corresponds to a primary channel occupied by the piece of data to a smaller one of a preset maximum window value and a value twice a current window value plus 1, where the data is the downlink PPDU or the trigger frame, and N is an integer greater than or equal to 1;

or when the AP sends, on the channel including the at least one idle primary channel, N pieces of data to the STA allocated to the idle primary channel, if one piece of data is successfully sent, updating, by the AP, a window value of a backoff counter whose value is 0 and that corresponds to a primary channel occupied by the piece of data to a preset minimum window value, or if one piece of data fails to be sent, updating, by the AP, a window value of a backoff counter corresponding to a primary channel occupied by the piece of data to a smaller one of a preset maximum window value and a value twice a current window value plus 1, where the data is the downlink PPDU or the trigger frame, and N is an integer greater than or equal to 1.

With reference to some implementations of the first aspect, the plurality of primary channels may correspond to a plurality of BSSs, and channels of at least two of the plurality of BSSs completely or partially overlap;

or the plurality of primary channels may correspond to a same BSS.

With reference to some implementations of the first aspect, when the plurality of primary channels correspond to the plurality of BSSs, some or all of the plurality of BSSs have a same identifier ID or a same BSS color, and stations in different BSSs in the some or all BSSs have different identifiers.

In this embodiment, identifiers IDs or BSS colors of some or all of the plurality of BSSs are set to be the same. Therefore, in this embodiment, stations in the plurality of BSSs that have the same BSS identifier ID or the same BSS color can be simultaneously scheduled by using one PPDU. It can be understood that a frame format of the PPDU may be the same as a frame format of a PPDU used when a plurality of stations are scheduled in a single BSS. This embodiment is not limited thereto.

According to a second aspect, a data scheduling method is provided. The method includes:

obtaining, by a STA, at least one of a plurality of primary channels allocated by an AP, where active access is forbidden on the plurality of primary channels; and receiving, by the STA, synchronous scheduling of the AP by using the at least one primary channel.

For example, in this embodiment, the AP sets the plurality of primary channels in a system bandwidth. The AP allocates at least one of the plurality of primary channels to each of a plurality of STAs, where active access is forbidden on the plurality of primary channels. The STA receives scheduling of the AP by using the at least one primary channel. In this embodiment, the AP sets the plurality of primary channels, so that the AP can flexibly schedule the station by using an idle primary channel. This avoids a problem caused by setting only one primary channel in the prior art, thereby improving data transmission efficiency.

In addition, in this embodiment, the AP schedules the STAs in a unified manner, so that it is ensured that only uplink transmission or downlink transmission can be performed at a same time, and a conflict caused when both uplink transmission and downlink transmission are performed at the same time can be avoided.

It can be understood that, in this embodiment, when scheduling the plurality of STAs to send uplink PPDUs, the AP may schedule some STAs to send uplink PPDUs on a primary channel or may schedule some STAs to send uplink PPDUs on a secondary channel. This embodiment is not limited thereto.

It can be understood that the second aspect may be performed by a station, and the first aspect may be performed by an access point that communicates with the station. The method in the second aspect performed by the station corresponds to the method in the first aspect performed by the access point. For an implementation and beneficial effects of the second aspect, refer to the foregoing descriptions. Detailed descriptions are properly omitted herein.

With reference to some implementations of the second aspect, that the STA receives scheduling of the AP by using the idle primary channel in the at least one primary channel includes:

receiving, by the STA by using the at least one primary channel, one downlink protocol data unit PPDU sent by the AP or a plurality of downlink PPDUs simultaneously sent by the AP, where each PPDU occupies at least one primary channel;

or receiving, by the STA by using the at least one primary channel, one trigger frame sent by the AP or a plurality of trigger frames simultaneously sent by the AP, where a PPDU in which each trigger frame is located occupies at least one primary channel, and the trigger frame is used to trigger the STA to send one uplink PPDU or simultaneously send a plurality of uplink PPDUs; and sending, by the STA to the AP, the uplink PPDU, or the plurality of uplink PPDUs simultaneously.

With reference to some implementations of the second aspect, the plurality of primary channels may correspond to a plurality of BSSs, and channels of at least two of the plurality of BSSs completely or partially overlap; or the plurality of primary channels may correspond to a same BSS.

With reference to some implementations of the second aspect, when the plurality of primary channels correspond to the plurality of BSSs, some or all of the plurality of BSSs have a same identifier ID or a same BSS color, and stations in different BSSs in the some or all BSSs have different identifiers.

With reference to some implementations of the second aspect, before the STA receives scheduling of the AP by using the idle primary channel in the at least one primary channel, the method further includes:

associating with, by the STA, the AP at least one of:

an uplink orthogonal frequency division multiplexing random access UORA;

an enhanced distributed channel access EDCA within a random contention period allocated by the AP; or through another AP, where the another AP and the AP belong to a same device.

With reference to some implementations of the second aspect, a maximum bandwidth corresponding to each of the plurality of primary channels is a maximum bandwidth supported by the AP.

According to a third aspect, a data scheduling apparatus is provided. The apparatus includes each module or unit configured to perform the method according to any one of the possible implementations of the first aspect.

In an implementation, the apparatus is an access point.

According to a fourth aspect, a data scheduling apparatus is provided. The apparatus includes each module or unit configured to perform the method according to any one of the possible implementations of the second aspect.

In an implementation, the apparatus is a station.

According to a fifth aspect, a data scheduling apparatus is provided. The apparatus includes a transceiver, a processor, and a memory. The processor is configured to control the transceiver to: send and receive signals, the memory is configured to store a computer program, and the processor is configured to: invoke the computer program from the memory and run the computer program, so that the apparatus performs the method according to the first aspect or the possible implementations of the first aspect.

In an implementation, the apparatus is an access point.

According to a sixth aspect, a data scheduling apparatus is provided. The apparatus includes a transceiver, a processor, and a memory. The processor is configured to control the transceiver to: send and receive signals, the memory is configured to store a computer program, and the processor is configured to: invoke the computer program from the memory and run the computer program, so that the apparatus performs the method according to the possible implementations of the second aspect.

In an implementation, the apparatus is a station.

According to a seventh aspect, a non-transitory computer-readable medium is provided. The non-transitory computer-readable medium stores a computer program. When the computer program is executed by a computer, the method according to any one of the possible implementations of the first aspect is implemented.

According to an eighth aspect, a non-transitory computer-readable medium is provided. The non-transitory computer-readable medium stores a computer program. When the computer program is executed by a computer, the method according to any one of the possible implementations of the second aspect is implemented.

According to a ninth aspect, a computer program product is provided. When the computer program product is executed by a computer, the method according to any one of the possible implementations of the first aspect is implemented.

According to a tenth aspect, a computer program product is provided. When the computer program product is executed by a computer, the method according to any one of the possible implementations of the second aspect is implemented.

According to an eleventh aspect, a processing apparatus is provided. The apparatus includes a processor and an interface.

The processor is configured to perform the method according to any one of possible implementations of the first aspect and the second aspect. A related data exchange process is completed through the interface. In an implementation process, the interface may further complete the data exchange process through the transceiver.

It can be understood that the processing apparatus according to the eleventh aspect may be a chip. The processor may be implemented by using hardware or may be implemented by using software. When the processor is implemented by using the hardware, the processor may be a logic circuit, an integrated circuit, or the like; or when the processor is implemented by using the software, the processor may be a general-purpose processor, and is implemented by reading software code stored in a memory. The memory may be integrated into the processor, may be located outside the processor, and may exist independently. The memory and the processor may communicate with each other in a wired or wireless manner.

According to a twelfth aspect, a system is provided. The system includes the foregoing access point and station.

BRIEF DESCRIPTION OF THE DRAWINGS

FIG. 4 is a schematic diagram of a channel mode according to an embodiment;

FIG. 5 is a schematic diagram of downlink transmission according to an embodiment;

FIG. 6 is a schematic diagram of uplink transmission according to an embodiment;

FIG. 7 is a schematic diagram of a channel mode according to another embodiment;

DETAILED DESCRIPTION OF THE EMBODIMENTS

Figure 1:
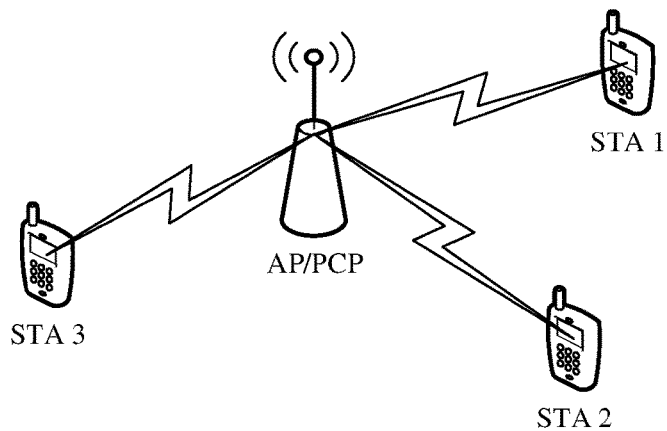
FIG. 1 is a schematic diagram of a scenario to which an embodiment is applicable.

The following describes the embodiments with reference to the accompanying drawings.

The solutions in the embodiments may be used in various communications systems, for example, a wireless local area network (WLAN) system. Optionally, the embodiments may be further used in a system in which beamforming training needs to be performed, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a new radio (NR) system.

Only the WLAN system is used as an example below to describe an application scenario in the embodiments and a method in the embodiments.

For example, the embodiments may be used in a wireless local area network (WLAN), and the embodiments may be used in any protocol in the Institute of Electrical and Electronics Engineers (IEEE) 802.11 series currently used in the WLAN. The WLAN may include one or more basic service sets (BSS). A network node in the basic service set includes an access point (AP or APs when plural) and a station (STA or STAs when plural). In IEEE 802.11ad, a personal basic service set (PBSS) and a personal basic service set control point (PCP) are introduced based on the original BSS. Each personal basic service set may include one AP/PCP and a plurality of stations associated with the AP/PCP. It can be understood that, in the embodiments, a device that communicates with the station may be an AP or a PCP. For ease of description, only communication between the AP and the station is used as an example below for description. A behavior of communication between the PCP and the station is similar to that of communication between the AP and the station.

It can be understood that, in the embodiments, the station may also be referred to a system, a subscriber unit, an access terminal, a mobile station, a mobile console, a remote station, a remote terminal, a mobile device, a user terminal, a terminal, a wireless communications device, a user agent, a user apparatus, or user equipment (UE). The station may be a wireless communications chip, a wireless sensor, or a wireless communications terminal. For example, the station is a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communications device supporting a Wi-Fi communication function, or a computer supporting a Wi-Fi communication function. Optionally, the station may support the 802.11ax standard. Further, optionally, the station supports a plurality of WLAN standards, such as 802.11ac, 802.11n, 802.11g, 802.11b, and 802.11a.

The AP in the embodiments may be configured to: communicate with the access terminal by using the wireless local area network, and transmit data from the access terminal to a network side, or transmit data from a network side to the access terminal. The AP is also be referred to as a wireless access point, a hotspot, or the like. The AP is an access point used by a mobile user to access a wired network, and is deployed in a home, inside a building, and inside a campus, with a typical coverage radius of tens of meters to hundreds of meters. Further, the AP may alternatively be deployed outdoors. The AP is equivalent to a bridge that connects a wired network and a wireless network. A main function of the AP is to connect wireless network clients together, and then connect the wireless network to the Ethernet. For example, the AP may be a terminal device or a network device with a wireless fidelity (Wi-Fi) chip. Optionally, the AP may be a device that supports the 802.11ax standard. Further, optionally, the AP may be a device that supports a plurality of WLAN standards, such as 802.11ac, 802.11n, 802.11g, 802.11b, and 802.11a.

In the embodiments, the access point or the station includes a hardware layer, an operating system layer running on the hardware layer, and an application layer running on the operating system layer. The hardware layer includes hardware such as a central processing unit (CPU), a memory management unit (MMU), or a memory (also referred to as a main memory). The operating system may be any one or more types of computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, a structure of an execution body of the method provided in the embodiments is not specially limited in the embodiments, provided that a program that records code of the method provided in the embodiments can be run to perform communication according to the method provided in the embodiments. For example, the method provided in the embodiments may be performed by the access point or the station, or a function module that can invoke and execute the program in the access point or the station.

In addition, aspects or features of the embodiments may be implemented as a method, an apparatus or a product that uses standard programming and/or engineering technologies. The term "product" used in the embodiments covers a computer program that can be accessed from any non-transitory computer-readable component, carrier or medium. For example, a non-transitory computer-readable medium may include, but is not limited to: a magnetic storage component (for example, a hard disk, a floppy disk, or a magnetic tape), an optical disc (for example, a compact disc (CD) or a digital versatile disc (DVD)), or a smart card and a flash memory component, such as an erasable programmable read-only memory (EPROM), a card, a stick, or a key drive). In addition, various storage media described may indicate one or more devices and/or other machine-readable media that are configured to store information. The term "machine-readable media" may include but is not limited to a radio channel, and various other media that can store, contain, and/or carry an instruction and/or data.

FIG. 1 is a schematic diagram of an application scenario according to an embodiment. A scenario system shown in FIG. 1 may be a WLAN system. The WLAN system in FIG. 1 may include one or more APs/PCPs and one or more STAs. In FIG. 1, one AP/PCP and three STAs are used as an example. Wireless communication may be performed between the AP/PCP and each of the STAs according to various standards. The wireless communication between the AP/PCP and the STA may be performed by using a single-user multiple-input multiple-output (SU-MIMO) technology or a multi-user multiple-input multiple-output (MU-MIMO) technology.

It can be understood that, in the embodiments, the AP may be an AP in a radio access device. The radio access device may have one AP. Optionally, a same radio access device may alternatively have a plurality of APs. The radio access device may support multiple bands (multiple bands), and each band may have one or more channels. When the radio access device has the plurality of APs, the plurality of APs belonging to the same device are sometimes referred to as co-located APs, and a plurality of BSSs corresponding to the plurality of APs are referred to as co-located BSSs. Different APs may correspond to different channels.

It can be understood that, in the embodiments, a device that communicates with the station may be the AP or the PCP. For ease of description, only communication between the AP and the station is used as an example below for description. A behavior of communication between the PCP and the station is similar to that of communication between the AP and the station.

In an existing standard, to ensure backwards compatibility, there is a unique primary 20 MHz channel regardless of the bandwidth in the WLAN system. Regardless of a bandwidth in which an access point (such as a wireless access point or AP) and a station (STA) send data, the primary 20 MHz channel needs to be included. However, when the primary 20 MHz channel is busy, all other idle secondary channels cannot be used; and consequently, system efficiency is greatly reduced.

In view of the foregoing problem, the embodiments provide a data scheduling method, to resolve the foregoing problem and improve data transmission efficiency.

In the embodiments, an AP sets a plurality of primary channels in a system bandwidth. The AP allocates at least one of the plurality of primary channels to each of a plurality of STAs, where active access is forbidden on the plurality of primary channels. The AP synchronously schedules a STA on a channel including at least one idle primary channel in the plurality of primary channels, where the synchronously scheduled STA is a STA allocated to the idle primary channel. In the embodiments, the AP sets the plurality of primary channels, so that the AP can flexibly schedule the station by using the idle primary channel. This avoids a problem caused by setting only one primary channel in the prior art, thereby improving data transmission efficiency.

In addition, in the embodiments, the AP schedules the STAs in a unified manner, so that it is ensured that only uplink transmission or downlink transmission can be performed at a same time, and a conflict caused when both uplink transmission and downlink transmission are performed at the same time can be avoided.

Figure 2:
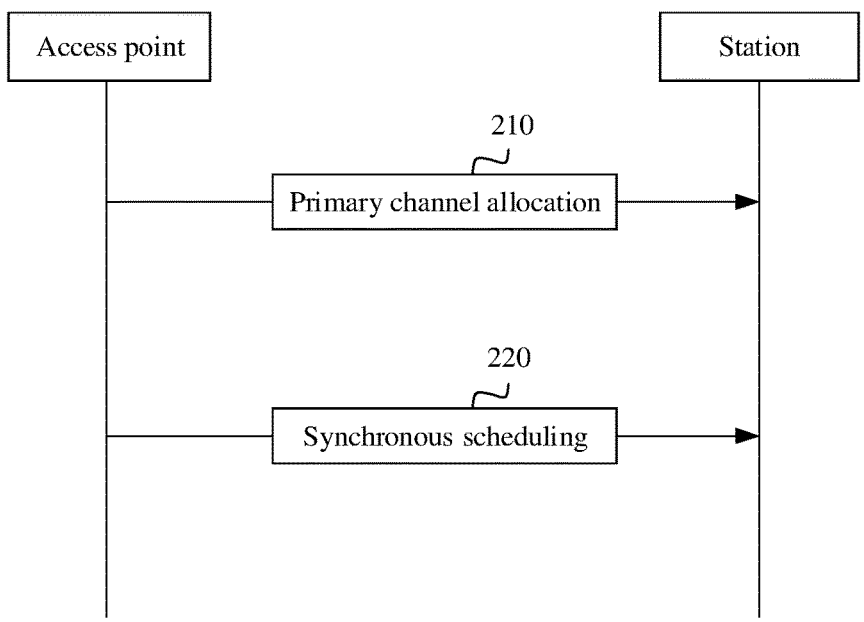
FIG. 2 is a schematic diagram of a data scheduling method according to an embodiment.

As an example, instead of a limitation, the following describes in detail a data scheduling method according to an embodiment with reference to FIG. 2.

A method 200 shown in FIG. 2 includes the following steps.

210: An AP allocates at least one of a plurality of primary channels to each of a plurality of STAs, where active access is forbidden on the plurality of primary channels.

Correspondingly, each of the plurality of STAs obtains at least one of the plurality of primary channels allocated by the AP.

The AP may first establish a plurality of primary channels, for example, two primary channels, three primary channels, or more primary channels. In other words, the AP sets the plurality of primary channels in a system bandwidth, where active access of a STA is forbidden on each of the plurality of primary channels. Then, the AP allocates at least one primary channel to each STA.

Alternatively, in this embodiment, the AP may first establish a primary channel, and allocate a group of STAs to the primary channel. Then, the AP establishes a second primary channel, and allocates a group of STAs to the second primary channel. Similarly, the AP establishes more primary channels, and correspondingly allocates STAs to the primary channels. Active access of a STA is forbidden on each primary channel.

It can be understood that, in this embodiment, for an AP, active access is forbidden on each of a plurality of primary channels established by the AP. For a STA, active access is forbidden on each of at least one primary channel allocated to the STA, and the STA may not need to consider a state of another primary channel to which the STA is not allocated.

During actual application, the AP may allocate each STA to one or more primary channels in a plurality of manners.

The AP sends a beacon frame or a probe response frame on each primary channel, where the beacon frame or the probe response frame carries indication information of the primary channel and BSS channel information. The STA selects a primary channel, and then associates with the AP on the primary channel.

Alternatively, the AP sends a beacon frame or a probe response frame on a primary channel, where the beacon frame or the probe response frame carries indication information of the primary channel and BSS channel information. The STA associates with the AP on the primary channel After association is completed, the AP sends a channel switching message to the STA, so that the STA switches to another primary channel.

Alternatively, the STA associates with a first AP, where the first AP works on a first channel After association is completed, the STA switches to a primary channel of a second AP by using a BSS switching procedure, where the second AP has a plurality of primary channels.

Alternatively, the STA associates with a first AP, where the first AP works on the first channel After association is completed, the first AP sends a beacon frame or a probe response frame that carries a multi-band element, where the multi-band element carries information about a primary channel of a second AP. The STA completes association with the primary channel of the second AP through on-channel tunneling (OCT) between the first AP and the STA. The second AP has a plurality of primary channels.

Figure 3:
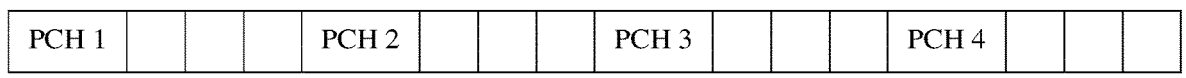
FIG. 3 is a schematic diagram of primary channel distribution according to an embodiment.

For example, as shown in FIG. 3, when the system bandwidth is 320 MHz, the AP may select one 20 MHz channel from each 80 MHz channel as a primary 20 MHz channel. In this way, there are four primary 20 MHz channels in the 320 MHz bandwidth. When one of the primary 20 MHz channels is unavailable, the other three primary 20 MHz channels may alternatively be used for sending, so that flexibility of data transmission can be improved, thereby improving data transmission efficiency.

Optionally, in an embodiment, a maximum bandwidth corresponding to each of the plurality of primary channels is a maximum bandwidth supported by the AP.

For example, in this embodiment, a maximum bandwidth mode corresponding to each primary channel may be the maximum bandwidth (namely, a maximum system bandwidth) supported by the AP. Therefore, in this embodiment, a maximum bandwidth of a protocol data unit (presentation protocol data unit or PPDU) sent by using a primary channel is not decreased because the plurality of primary channels are introduced. In other words, for another primary channel, the primary channel is a secondary channel. When a channel bandwidth including the plurality of primary channels is idle, the AP may choose to send a PPDU corresponding to a primary channel, or may send a plurality of PPDUs, where each PPDU corresponds to a primary channel. When a large-bandwidth PPDU (that is, a bandwidth of the PPDU includes the plurality of primary channels) is sent, the large-bandwidth PPDU may provide a higher peak rate for the STAs, where the STAs allocated to different primary channels may use the channel in a time division manner. When the AP sends the plurality of PPDUs concurrently, although a peak rate of a STA corresponding to each PPDU is reduced, the plurality of STAs on the plurality of primary channels can simultaneously use the channel. This helps reduce a latency. Thus, during actual application, the AP may flexibly perform scheduling in the foregoing manner based on an actual requirement. This embodiment is not limited thereto.

It can be understood that, in this embodiment, the maximum bandwidth supported by the AP is not limited to 320 MHz. For example, the maximum bandwidth supported by the AP may be less than 320 MHz, for example, 160 MHz. Alternatively, the maximum bandwidth supported by the AP may be greater than 320 MHz, for example, 640 MHz. This embodiment is not limited thereto.

It can be noted that, before the STAs associate with the AP, the AP does not know existence of the STAs; and consequently, the AP cannot schedule the STAs. In this embodiment, active access of the stations is forbidden on the primary channels. Therefore, the AP needs to associate with the STAs, so that the AP then can schedule the STAs.

Optionally, in another implementation, in this embodiment, the STAs may associate with the AP at least one of:
  an uplink orthogonal frequency division multiplexing random access (uplink OFDMA random access, UORA);
  an enhanced distributed channel access (EDCA) within a random contention period allocated by the AP; or through another AP, where the another AP and the AP belong to a same device.

Thus, in an implementation, the plurality of STAs may send uplink frames to the AP in the UORA manner, to associate with the AP.

Alternatively, in another implementation, in this embodiment, the AP may allocate some random contention periods. For example, the plurality of STAs are allowed to perform EDCA within the random contention periods, and EDCA is forbidden within another time period. In this way, the STAs may send uplink frames within EDCA time periods, to associate with the AP.

Alternatively, in another implementation, the plurality of STAs may associate with the AP through the another AP, where the another AP and the AP belong to the same device (a radio access device).

It can be noted that, in this embodiment, one radio access device may have one AP or a plurality of APs. The radio access device may support multiple bands (multiple bands), and each band may have one or more channels. When the radio access device has the plurality of APs, the plurality of APs belonging to a same radio access device are sometimes referred to as co-located APs, and a plurality of BSSs corresponding to the plurality of APs are referred to as co-located BSSs. Different APs may correspond to different channels. In this embodiment, the plurality of STAs may associate with the AP through the another AP that belongs to the same radio access device as the AP. The two APs may work on one band, or may work on two bands. The bands may include but are not limited to bands of 2.4 GHz, 5 GHz, 6 GHz, and 60 GHz. This embodiment is not limited thereto. The another AP allows random access of the STAs. For example, the another AP allows random access of the STAs, so that the plurality of STAs can associate with the AP through the another AP. Thus, for a frame format and a message of a frame sent when the STAs associate with the AP through the another AP, refer to descriptions in the IEEE 802.11-2016 standard. Details are not described herein.

It can be noted that, in this embodiment, the STAs may alternatively associate with the AP in another manner. This embodiment is not limited thereto. For example, the STAs may alternatively associate with the AP in a distributed coordination function (DCF) manner.

In this embodiment, the STAs need to first associate with the AP. After association is completed, the AP allocates one or more primary channels (for example, the primary channel is a primary 20 MHz channel) to each STA. Finally, the STAs associated with the AP form a STA group in each primary 20 MHz channel. Each group of STAs may focus only on a primary 20 MHz channel allocated to the group of STAs, and the STAs may not receive a PPDU that is not sent by using the allocated primary 20 MHz channel.

Optionally, in this embodiment, the AP may further send a beacon frame on each primary 20 MHz channel, so that the STAs on each primary 20 MHz channel can perform clock synchronization and update BSS parameters.

In this embodiment, active access is forbidden on the primary channels, and both uplink transmission and downlink transmission are scheduled by the AP. Therefore, in this embodiment, it can be avoided that uplink transmission is performed on a primary 20 MHz channel while downlink transmission is performed on another 20 MHz channel.

Because the AP schedules the STAs in a unified manner, in this embodiment, the AP may support a plurality of primary 20 MHz channels by using a single transceiver. During actual application, because the AP schedules the STAs in the unified manner, the AP may choose to ignore uplink random access information sent by the STAs and does not respond to the STAs.

220: The AP synchronously schedules a STA on a channel including at least one idle primary channel, where the synchronously scheduled STA is a STA allocated to the at least one idle primary channel, and the at least one idle primary channel is at least one of the plurality of primary channels.

In a solution, assuming that the AP does not synchronously schedule the STA, the following problem exists: in a process in which the AP sends data on a primary 20 MHz channel, an associated STA sends uplink data to the AP by using another primary 20 MHz channel. In this case, if the AP has only one set of transceivers and is not capable of simultaneously performing transmission and reception on different channels, the AP cannot perform uplink reception; and consequently, uplink transmission fails. In addition, when the AP simultaneously performs downlink transmission by using two primary 20 MHz channels, if lengths of data on the two channels are different, a target STA on a first channel on which transmission is first completed returns a block acknowledgment (BA) first. In this case, the AP has not completed transmission on a second channel; and consequently, the AP cannot receive the BA on the first channel, resulting in packet loss. Similarly, when uplink transmission is simultaneously performed on the two primary 20 MHz channels, the AP still receives data on the second channel after data transmission on the first channel is completed; and consequently, the AP cannot return a BA on the first channel, resulting in packet loss.

In this embodiment, by setting a plurality of primary channels, the AP may determine, based on clear channel assessment (CCA) results of the plurality of primary channels, a bandwidth mode used for sending, so that the AP can flexibly schedule the station by using the idle primary channel. This avoids a problem caused by setting only one primary channel in the prior art, thereby improving data transmission efficiency.

In addition, in this embodiment, active access is forbidden on the primary channels, and both uplink transmission and downlink transmission are scheduled by the AP. Therefore, in this embodiment, it can be avoided that uplink transmission is performed on a primary 20 MHz channel while downlink transmission is performed on another 20 MHz channel, so that packet loss that occurs when the AP cannot simultaneously perform transmission and reception on the plurality of channels can be avoided.

It can be understood that, in this embodiment, the STA may have one or more sets of transceivers. The following separately describes a data scheduling procedure in which the STA has one set of transceivers and a data scheduling procedure in which the STA has a plurality of sets of transceivers.

When the STA has only one set of transceivers, the STA needs to first associate with the AP. For example, the STA associates with the AP in any one of the foregoing manners, for example, through the another AP belonging to the same device as the AP, that is, through a co-located AP of the AP. After association is completed, the AP allocates at least one primary 20 MHz channel to the STA. The STA communicates with the AP by using the bandwidth mode including the specified primary 20 MHz channel. Active access of the STA is not allowed on the allocated primary channel, and the STA can only wait for the AP to send a trigger (trigger) frame for scheduling. When the STA has urgent data or does not receive scheduling of the AP for a long time, the STA switches to a co-located BSS, and then sends uplink data to the AP through EDCA.

When the STA has N (N>=2) sets of transceivers, the STA needs to first associate with the AP in a co-located BSS. After association is completed, the AP may switch (N−1) sets of transceivers of the STA to the plurality of primary channels, where each set of transceivers corresponds to one primary 20 MHz channel, and one set of transceivers is reserved to continue to work in the co-located BSS. The STA receives, on the primary channel, downlink data sent by the AP, and sends uplink data on a specified time-frequency resource after receiving scheduling information of the AP. When the STA has urgent data or does not receive scheduling of the AP for a long time, the STA sends the uplink data to the AP through EDCA in the co-located BSS. The STA may send and receive data by using any primary 20 MHz channel allocated by the AP. In this way, when a primary 20 MHz channel is unavailable, the STA may still send and receive data by using another primary 20 MHz channel. This helps ensure a data latency.

The AP may alternatively switch the N sets of transceivers of the STA to the plurality of primary channels, where each set of transceivers corresponds to one primary 20 MHz channel. The STA receives, on the primary channel, downlink data sent by the AP, and sends uplink data on a specified time-frequency resource after receiving scheduling information of the AP. When the STA has urgent data or does not receive scheduling of the AP for a long time, the STA switches one set of transceivers to a co-located BSS, and then sends uplink data to the AP through EDCA. The STA may send and receive data by using any primary 20 MHz channel allocated by the AP. In this way, when a primary 20 MHz channel is unavailable, the STA may still send and receive data by using another primary 20 MHz channel. This helps ensure a data latency.

Optionally, in another embodiment, in 220, the AP sends, on the channel including the at least one idle primary channel, to the STA allocated to the idle primary channel, one downlink protocol data unit PPDU, or a plurality of downlink PPDUs simultaneously, where each PPDU occupies at least one primary channel, and each PPDU is used to schedule a STA corresponding to the primary channel occupied by the PPDU;

or in 220, the AP sends, on the channel including the at least one idle primary channel, to the STA allocated to the idle primary channel, one trigger frame, or a plurality of trigger frames simultaneously, where a PPDU in which each trigger frame is located occupies at least one primary channel, each trigger frame is used to schedule a STA corresponding to the primary channel occupied by the PPDU in which the trigger frame is located, and the trigger frame is used to trigger the STA allocated to the idle primary channel to send one uplink PPDU or simultaneously send a plurality of uplink PPDUs; and the AP receives the uplink PPDU, or the plurality of uplink PPDUs simultaneously.

For example, the AP may schedule a corresponding STA by including a STA identifier in at least one user information (or user info) field in the trigger frame. Each user information field may carry a STA identifier. This embodiment is not limited thereto.

It can be understood that, in this embodiment, the channel including the at least one idle primary channel may include only the at least one idle primary channel, or may include the at least one idle primary channel, another primary channel, and a secondary channel. This embodiment is not limited thereto.

The following describes a solution in which the AP determines the idle primary channel in a backoff manner and schedules the STA by using the channel including the at least one idle primary channel in this embodiment.

Thus, during actual application, the AP executes backoff. When determining that the primary channel is in an idle state, the AP synchronously sends one or more downlink PPDUs on the channel including the at least one idle primary channel, or synchronously schedules one or more uplink PPDUs by using the trigger frame.

The following provides three embodiments to describe the solution in which the AP determines the idle primary channel and schedules the STA by using the channel including the idle primary channel.

Embodiment 1

The plurality of primary channels correspond to one backoff counter, after a continuous idle time period of a first primary channel in the plurality of primary channels reaches an arbitration interframe space (AIFS), if the first primary channel continues to be idle, the backoff counter is decreased by 1 for each idle slot, and when a value of the backoff counter is 0, the first primary channel is in the idle state, where the first primary channel is any one of the plurality of primary channels.

When the value of the backoff counter is decreased to 0, the AP checks whether another primary 20 MHz channel and a secondary channel are idle within a PCF interframe space (PIFS) time period before the backoff counter is decreased to 0. If the another primary 20 MHz channel and the secondary channel are idle, the another primary 20 MHz channel, the secondary channel, and the primary 20 MHz channel may form the channel including the at least one idle primary channel, and data is sent through the channel. For example, the AP sends the downlink PPDU or the trigger frame and receives the uplink PPDU.

Further, the method includes: when the AP sends, on the channel including the at least one idle primary channel, N pieces of data to the STA allocated to the idle primary channel, if at least one piece of data is successfully sent, updating, by the AP, a window value of the backoff counter to a preset minimum window value (CWmin), or if all the N pieces of data fail to be sent, updating, by the AP, a window value of the backoff counter to a smaller one (namely, min(CWmax, 2*CW+1)) of a preset maximum window value and a value twice a current window value plus 1, where the data is the downlink PPDU or the trigger frame, and N is an integer greater than or equal to 1.

Embodiment 2

Each of the plurality of primary channels corresponds to one backoff counter, after a continuous idle time period of a second primary channel in the plurality of primary channels reaches an AIFS, if the second primary channel continues to be idle, a second backoff counter corresponding to the second primary channel is decreased by 1 for each idle slot, and when a value of the second backoff counter is 0, the second primary channel is in the idle state, where the second primary channel is any one of the plurality of primary channels.

When a value of a backoff counter corresponding to a primary 20 MHz channel is decreased to 0, the AP checks whether another primary 20 MHz channel and a secondary channel are idle within a PIFS time period before the backoff counter is decreased to 0. If the another primary 20 MHz channel and the secondary channel are idle, the another primary 20 MHz channel, the secondary channel, and the primary 20 MHz channel may form the channel including the at least one idle primary channel, and data is sent through the channel. For example, the AP sends the downlink PPDU or the trigger frame and receives the uplink PPDU.

Embodiment 3

Each of the plurality of primary channels corresponds to one backoff counter, after a continuous idle time period of a third primary channel in the plurality of primary channels reaches an AIFS, if the third primary channel continues to be idle, a third backoff counter corresponding to the third primary channel is decreased by 1 for each idle slot, and after a value of the third backoff counter is 0, when a value of a fourth backoff counter corresponding to a fourth primary channel in the plurality of primary channels other than the third primary channel is backed off to 0, the fourth primary channel is in the idle state, where the third primary channel and the fourth primary channel are any two of the plurality of primary channels.

When a value of a backoff counter corresponding to a primary 20 MHz channel is decreased to 0, the backoff counter is suspended (that is, the value remains 0). After values of backoff counters corresponding to all the primary 20 MHz channels are decreased to 0, the AP checks whether channels other than a primary 20 MHz channel corresponding to a last backoff counter that is decreased to 0 are idle within a PIFS time period before the last backoff counter is decreased to 0. If the channels are idle, the channels and the primary 20 MHz channel that corresponds to the last backoff counter that is decreased to 0 may form the channel including the at least one idle primary channel, and data is sent through the channel. For example, the AP sends the downlink PPDU or the trigger frame and receives the uplink PPDU.

It can be understood that a backoff embodiment of the fourth primary channel is similar to that of the third primary channel. To avoid repetition, details are not described herein again.

It can be noted that, in embodiment 3, the foregoing describes a case in which the AP may determine that the fourth primary channel is in the idle state when the value of the backoff counter of the fourth primary channel is 0 after the backoff counter of the third primary channel is 0. Optionally, during actual application, after the backoff counter of the third primary channel is 0, the AP may determine, after backoff counters of a plurality of other primary channels (for example, two, three, or more primary channels) are all 0, that the primary channel corresponding to the last backoff counter that is backed off to 0 is in the idle state.

Further, in the foregoing embodiment 2 or embodiment 3, the method may further include:

when the AP sends, on the channel including the at least one idle primary channel, N pieces of data to the STA allocated to the idle primary channel, if at least one piece of data is successfully sent, updating, by the AP, a window value of a backoff counter corresponding to a primary channel occupied by the N pieces of data to a preset minimum window value, or if all the N pieces of data fail to be sent, updating, by the AP, a window value of a backoff counter corresponding to a primary channel occupied by the N pieces of data to a smaller one of a preset maximum window value and a value twice a current window value plus 1, where the data is the downlink PPDU or the trigger frame, and N is an integer greater than or equal to 1;

or when the AP sends, on the channel including the at least one idle primary channel, N pieces of data to the STA allocated to the idle primary channel, if at least one piece of data is successfully sent, updating, by the AP, a window value of a backoff counter corresponding to a primary channel occupied by the N pieces of data to a preset minimum window value, or if all the N pieces of data fail to be sent, updating, by the AP, a window value of a backoff counter whose value is 0 and that corresponds to a primary channel occupied by the N pieces of data to a smaller one of a preset maximum window value and a value twice a current window value plus 1, where the data is the downlink PPDU or the trigger frame, and N is an integer greater than or equal to 1;

or when the AP sends, on the channel including the at least one idle primary channel, N pieces of data to the STA allocated to the idle primary channel, if at least one piece of data is successfully sent, updating, by the AP, a window value of a backoff counter whose value is 0 and that corresponds to a primary channel occupied by the N pieces of data to a preset minimum window value, or if all the N pieces of data fail to be sent, updating, by the AP, a window value of a backoff counter whose value is 0 and that corresponds to a primary channel occupied by the N pieces of data to a smaller one of a preset maximum window value and a value twice a current window value plus 1, where the data is the downlink PPDU or the trigger frame, and N is an integer greater than or equal to 1;

or when the AP sends, on the channel including the at least one idle primary channel, N pieces of data to the STA allocated to the idle primary channel, if at least one piece of data is successfully sent, updating, by the AP, a window value of a backoff counter whose value is 0 and that corresponds to a primary channel occupied by the N pieces of data to a preset minimum window value, or if all the N pieces of data fail to be sent, updating, by the AP, a window value of a backoff counter corresponding to a primary channel occupied by the N pieces of data to a smaller one of a preset maximum window value and a value twice a current window value plus 1, where the data is the downlink PPDU or the trigger frame, and N is an integer greater than or equal to 1;

or when the AP sends, on the channel including the at least one idle primary channel, N pieces of data to the STA allocated to the idle primary channel, if one piece of data is successfully sent, updating, by the AP, a window value of a backoff counter corresponding to a primary channel occupied by the piece of data to a preset minimum window value, or if one piece of data fails to be sent, updating, by the AP, a window value of a backoff counter corresponding to a primary channel occupied by the piece of data to a smaller one of a preset maximum window value and a value twice a current window value plus 1, where the data is the downlink PPDU or the trigger frame, and N is an integer greater than or equal to 1;

or when the AP sends, on the channel including the at least one idle primary channel, N pieces of data to the STA allocated to the idle primary channel, if one piece of data is successfully sent, updating, by the AP, a window value of a backoff counter corresponding to a primary channel occupied by the piece of data to a preset minimum window value, or if one piece of data fails to be sent, updating, by the AP, a window value of a backoff counter whose value is 0 and that corresponds to a primary channel occupied by the piece of data to a smaller one of a preset maximum window value and a value twice a current window value plus 1, where the data is the downlink PPDU or the trigger frame, and N is an integer greater than or equal to 1;

or when the AP sends, on the channel including the at least one idle primary channel, N pieces of data to the STA allocated to the idle primary channel, if one piece of data is successfully sent, updating, by the AP, a window value of a backoff counter whose value is 0 and that corresponds to a primary channel occupied by the piece of data to a preset minimum window value, or if one piece of data fails to be sent, updating, by the AP, a window value of a backoff counter whose value is 0 and that corresponds to a primary channel occupied by the piece of data to a smaller one of a preset maximum window value and a value twice a current window value plus 1, where the data is the downlink PPDU or the trigger frame, and N is an integer greater than or equal to 1;

or when the AP sends, on the channel including the at least one idle primary channel, N pieces of data to the STA allocated to the idle primary channel, if one piece of data is successfully sent, updating, by the AP, a window value of a backoff counter whose value is 0 and that corresponds to a primary channel occupied by the piece of data to a preset minimum window value, or if one piece of data fails to be sent, updating, by the AP, a window value of a backoff counter corresponding to a primary channel occupied by the piece of data to a smaller one of a preset maximum window value and a value twice a current window value plus 1, where the data is the downlink PPDU or the trigger frame, and N is an integer greater than or equal to 1.

It can be understood that the foregoing embodiments are merely examples. A person of ordinary skill in the art may make proper variations based on the foregoing examples, and these variations shall also fall within the scope of the embodiments. For example, the AP may alternatively update the CW in another embodiment. This embodiment is not limited thereto.

It can be noted that, in this embodiment, the plurality of primary channels may correspond to one BSS or may correspond to a plurality of BSSs. This embodiment is not limited thereto.

For two cases—a case in which a plurality of primary channels may correspond to one BSS and a case in which a plurality of primary channels may correspond to a plurality of BSSs, the following separately describes a scheduling method in this embodiment by using examples.

Case 1:

A plurality of primary channels may correspond to one BSS.

The following uses an example in which a total bandwidth of the BSS is 320 MHz, a total of four primary 20 MHz channels are established, and the primary 20 MHz channels are respectively located in different 80 MHz channels for description.

During actual application, a possible channel mode is shown in FIG. 4. Each grid in the first row in FIG. 4 represents 20 MHz, and a PCH n represents an $n^{th}$ primary 20 MHz channel. In FIG. 4, the second row shows four possible embodiments of sending a PPDU in a 20 MHz bandwidth, the third row shows four possible embodiments of sending a PPDU in a 40 MHz bandwidth, the fourth row shows four embodiments of sending a PPDU in an 80 MHz bandwidth, the fifth row shows two embodiments of sending a PPDU in a 160 MHz bandwidth, and the sixth row shows an embodiments of sending a PPDU in a 320 MHz bandwidth. It can be seen from FIG. 4 that, when the first primary 20 MHz channel is unavailable, a 20 MHz channel, a 40 MHz channel, an 80 MHz channel, a 160 MHz channel, and a 320 MHz channel that include the first primary 20 MHz channel are no longer available. However, there are still three 20 MHz bandwidth modes, three 40 MHz bandwidth modes, three 80 MHz bandwidth modes, and one 160 MHz bandwidth mode available. Therefore, it can be understood that, after the plurality of primary 20 MHz channels are introduced, channel use flexibility can be greatly improved, thereby improving channel utilization and data transmission efficiency.

In this embodiment, both uplink transmission and downlink transmission in the BSS may be performed. Therefore, the plurality of PPDUs may be simultaneously sent by using the plurality of primary 20 MHz channels, to further improve channel utilization. For example, in FIG. 4, when the first primary 20 MHz channel is unavailable, if only one PPDU can be sent, a maximum bandwidth mode of 160 MHz is used. However, when the plurality of PPDUs may be simultaneously sent, the last three PPDUs in 80 MHz bandwidths, or the second PPDU in an 80 MHz bandwidth and the second PPDU in a 160 MHz bandwidth may be selected for use. In this way, a total channel bandwidth can reach 240 MHz, thereby further improving channel utilization efficiency. However, when the plurality of PPDUs are used, it can be noted that, as shown in FIG. 5, it needs to be ensured that the plurality of downlink PPDUs are synchronized in time, that is, start and end simultaneously. In this way, it can be ensured that uplink response frames can be sent simultaneously after transmission of the plurality of PPDUs ends, so that while performing downlink transmission on a channel, the AP does not need to perform uplink reception on another channel. Similarly, when the AP simultaneously schedules the plurality of uplink PPDUs, as shown in FIG. 6, same duration needs to be first set for trigger frames on the plurality of channels, so that the plurality of uplink PPDUs can be sent simultaneously. By setting the same duration of the uplink PPDUs, it can be further ensured that subsequent BAs can be synchronized in time, so that while performing downlink transmission on a channel, the AP does not need to perform uplink reception on another channel.

For another example, as shown in FIG. 4, when the first primary 20 MHz channel is unavailable, if the AP supports preamble puncturing, two PPDUs in 160 MHz bandwidths may be simultaneously sent. The first primary 20 MHz channel in the first PPDU in the 160 MHz bandwidth needs to be punctured (that is, no information is sent on the first primary 20 MHz channel). Alternatively, a PPDU in a 320 MHz bandwidth is used, and the first primary 20 MHz channel is punctured. In this way, a total channel bandwidth can reach 300 MHz, thereby further improving channel utilization efficiency.

It can be noted that, in the foregoing examples, when the first primary 20 MHz channel is unavailable, the AP cannot schedule STAs allocated to the first primary 20 MHz channel, because the STAs do not receive a PPDU sent on the secondary channel.

It can be understood that, in this embodiment, the foregoing merely uses an example to describe a case in which the primary channel is 20 MHz. During actual application, the primary channel may alternatively be less than 20 MHz or greater than 20 MHz. This embodiment is not limited thereto.

It can be further understood that the foregoing merely uses an example to describe a case in which the AP establishes four primary channels. During actual application, there may be another quantity of primary channels, for example, two primary channels, six primary channels, or eight primary channels. This embodiment is not limited thereto.

For example, in an implementation, in this embodiment, each 20 MHz in the BSS may be used as a primary 20 MHz channel. For example, 16 primary channels can be established in the 320 MHz channel. It can be understood that, more primary 20 MHz channels set in the BSS indicate higher potential efficiency, but scheduling complexity is also increased. In an implementation process, an appropriate compromise solution may be selected based on complexity and efficiency. This embodiment is not limited thereto.

Case 2:

A plurality of primary channels may correspond to a plurality of BSSs.

For example, the plurality of primary channels may correspond to the plurality of BSSs, and channels of at least two of the plurality of BSSs completely or partially overlap.

It can be understood that, in this embodiment, a quantity of BSSs may be equal to a quantity of primary channels. In this case, the plurality of BSSs may be in a one-to-one correspondence with the plurality of primary channels.

In this embodiment, a quantity of BSSs may alternatively be less than a quantity of primary channels. For example, at least one of the BSSs corresponds to at least two primary channels. This embodiment is not limited thereto.

In Case 1, the AP establishes one BSS, where the BSS has a plurality of primary 20 MHz channels. However, in Case 2, the AP establishes a plurality of BSSs, where each BSS has one or more different primary 20 MHz channels, and channels of the plurality of BSSs completely or partially overlap.

For example, it is assumed that the AP establishes n (n>=2) BSSs. Herein, the n BSSs are referred to as a BSS 1, a BSS 2, . . . , and a BSS n. Because channels of each BSS may overlap, in this embodiment, a bandwidth of each BSS may reach the maximum bandwidth supported by the AP. The following uses an example for description. It is assumed that a bandwidth supported by the AP is 320 MHz, a total of four BSSs are set, and primary 20 MHz channels of the BSSs are respectively located on different 80 MHz channels. As shown in FIG. 7, a PCH 1, a PCH 2, a PCH 3, and a PCH 4 are respectively primary 20 MHz channels of a BSS 1, a BSS 2, a BSS 3, and a BSS 4. A 20 MHz bandwidth mode, a 40 MHz bandwidth mode, and an 80 MHz bandwidth mode of a BSS do not overlap those of another BSS. The BSS 1 and the BSS 2 share a same 160 MHz bandwidth mode, and the BSS 3 and the BSS 4 share a same 160 MHz bandwidth mode. The BSS 1, the BSS 2, the BSS 3, and the BSS 4 share a same 320 MHz bandwidth mode. In this way, a bandwidth supported by each BSS reaches 320 MHz through overlapping of different BSS channels. Further, when there are different pieces of BSS data and different locations of the primary 20 MHz channels of the BSSs, overlapping channel modes of the BSSs may be different. This embodiment is not limited thereto.

Correspondingly, in Case 2, the STAs are associated with one or more BSSs, instead of being allocated by the AP to one or more primary 20 MHz channels in one BSS in Case 1. Because the AP establishes the plurality of BSSs, after channel contention ends, the AP may select one BSS to send a PPDU or may select the plurality of BSSs to synchronously send a plurality of PPDUs, where the PPDUs occupy different channels.

In this embodiment, channels of the plurality of BSSs overlap with each other. Therefore, if stations in the plurality of BSSs are allowed to be scheduled in one PPDU, there are more advantages. For example, signaling overheads can be reduced. In the example shown in FIG. 7, when the entire 320 MHz channel is available, if one STA in each of the BSS 1 and the BSS 2 needs to transmit data, and a bandwidth required by each STA is 160 MHz, because PPDUs, in a 160 MHz bandwidth, of the BSS 1 and the BSS 2 occupy a same channel, the two PPDUs cannot be sent by using the two BSSs to allocate a 160 MHz bandwidth to each of the BSS 1 and the BSS 2. If a station is allowed to be scheduled across BSSs in one PPDU, the AP may send a PPDU in a 320 MHz bandwidth, and simultaneously schedule the STAs in the BSS 1 and the BSS 2 by allocating a 160 MHz bandwidth to each of the STA in the BSS 1 and the STA in the BSS 2.

In another embodiment, when the plurality of primary channels may correspond to the plurality of BSSs, some or all of the plurality of BSSs may have a same identifier ID or a same BSS color, and stations in different BSSs in the some or all BSSs have different identifiers.

Figure 8:
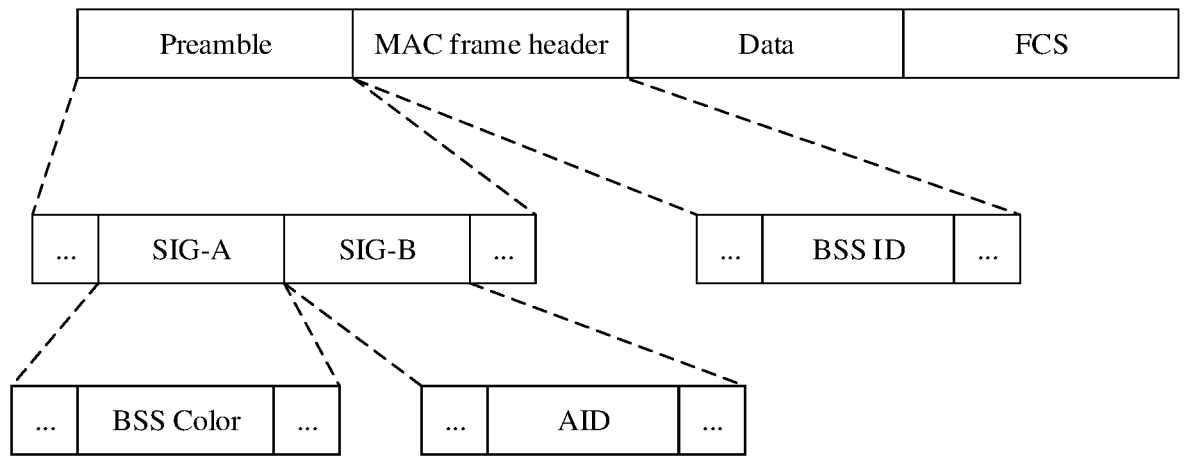
FIG. 8 is a schematic diagram of a downlink PPDU according to an embodiment.

For example, as shown in FIG. 8, in this embodiment, the downlink PPDU may include a preamble field, a media access control (MAC) frame header field, a data field, and a frame check sequence (FCS) field. In the PPDU, a signaling A (SIG-A) field in a preamble carries the same BSS color, the MAC frame header field carries the same BSS ID, and a signaling B (SIG-B) field in the preamble carries the different station identifiers, for example, station association identifiers (AID).

In this embodiment, identifiers IDs or BSS colors of some or all of the plurality of BSSs are set to be the same. Therefore, in this embodiment, stations in the plurality of BSSs that have the same BSS identifier (ID) or the same BSS color can be simultaneously scheduled by using one PPDU. It can be understood that a frame format of the PPDU may be the same as a frame format of a PPDU used when a plurality of stations are scheduled in a single BSS. This embodiment is not limited thereto.

It can be understood that the foregoing examples in FIG. 1 to FIG. 8 are merely intended to help a person of ordinary skill in the art understand the embodiments, but are not intended to limit the embodiments to a value or a scenario in the examples. A person of ordinary skill in the art apparently can make various equivalent modifications or changes according to the examples shown in FIG. 1 to FIG. 8, and such modifications or changes also fall within the scope of the embodiments.

It can be understood that sequence numbers of the foregoing processes do not mean execution sequences in the embodiments. The execution sequences of the processes can be determined based on functions and internal logic of the processes and should not be construed as any limitation on the implementation processes of the embodiments.

The foregoing describes in detail the methods in the embodiments with reference to FIG. 1 to FIG. 8. The following describes data scheduling apparatuses in the embodiments with reference to FIG. 9 to FIG. 12.

Figure 9:
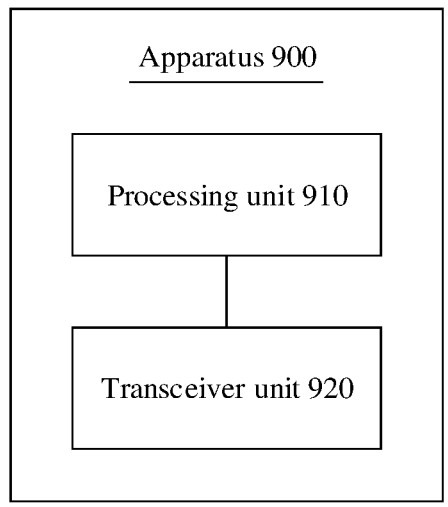
FIG. 9 is a schematic diagram of an apparatus according to an embodiment.

FIG. 9 is a schematic structural diagram of a data scheduling apparatus according to an embodiment. The apparatus 900 may include:

a processing unit 910 and a transceiver unit 920.

The processing unit 910 is configured to allocate at least one of a plurality of primary channels to each of a plurality of STAs, where active access is forbidden on the plurality of primary channels.

The transceiver unit 920 is configured to synchronously schedule a STA on a channel including at least one idle primary channel, where the synchronously scheduled STA is a STA allocated to the at least one idle primary channel, and the at least one idle primary channel is at least one of the plurality of primary channels.

Therefore, in the embodiments, an AP sets the plurality of primary channels in a system bandwidth. The AP allocates at least one of the plurality of primary channels to each of the plurality of STAs, where active access is forbidden on the plurality of primary channels. The AP synchronously schedules the STA on the channel including the at least one idle primary channel in the plurality of primary channels, where the synchronously scheduled STA is the STA allocated to the idle primary channel. In this embodiment, the AP sets the plurality of primary channels, so that the AP can flexibly schedule the station by using the idle primary channel. This avoids a problem caused by setting only one primary channel in the prior art, thereby improving data transmission efficiency.

In addition, in this embodiment, the AP may schedule the STAs in a unified manner, so that it is ensured that only uplink transmission or downlink transmission can be performed at a same time, and a conflict caused when both uplink transmission and downlink transmission are performed at the same time can be avoided.

It can be understood that the apparatus 900 has any function of the access point in the method embodiments. Details are not described herein again.

It can be understood that the term "unit" in this embodiment may be an application-specific integrated circuit (ASIC), an electronic circuit, a processor (for example, a shared processor, a dedicated processor, or a group processor) configured to execute one or more software or firmware programs, a memory, a merge logic circuit, and/or another suitable component that supports the described function.

In an optional example, a person of ordinary skill in the art may understand that the apparatus 900 provided in the embodiments corresponds to the process performed by the access point in the method embodiment in FIG. 2. For functions of the units/modules in the apparatus, refer to the foregoing descriptions. Details are not described herein again.

It can be understood that the apparatus in FIG. 9 may be an access point or may be a chip or an integrated circuit installed in an access point.

Figure 10:
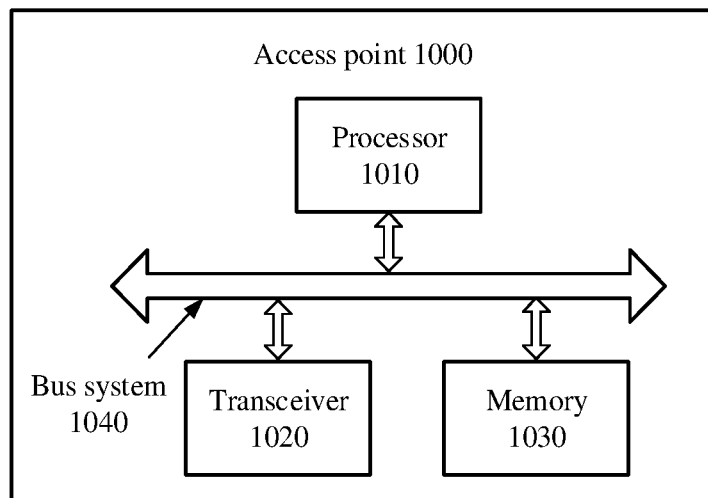
FIG. 10 is a schematic diagram of an access point according to an embodiment.

An access point is used as an example. FIG. 10 is a schematic structural diagram of an access point according to an embodiment. As shown in FIG. 10, the access point 1000 may be used in the system shown in FIG. 1, to perform any function of the access point in the method embodiments.

As shown in FIG. 10, the access point 1000 may include a processor 1010 and a transceiver 1020. The processor 1010 is connected to the transceiver 1020. Optionally, the access point 1000 further includes a memory 1030, and the memory 1030 is connected to the processor 1010. Further, optionally, the access point 1000 may further include a bus system 1040. The processor 1010, the memory 1030, and the transceiver 1020 may be connected by using the bus system 1040. The memory 1030 may be configured to store an instruction. The processor 1010 may correspond to the processing unit 910, and the transceiver 1020 may correspond to the transceiver unit 920. Thus, the processor 1010 is configured to execute the instruction to control the transceiver 1020 to send and receive information or signals, and the memory 1030 stores the instruction.

It can be understood that, in this embodiment, the processor may be a central processing unit (CPU), or may be another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory may include a read-only memory and a random access memory and provide an instruction and data for the processor. A part of the memory may further include a non-volatile random access memory. For example, the memory may further store information about a device type.

The bus system may further include a power bus, a control bus, a status signal bus, and the like, in addition to a data bus. However, for clear description, various types of buses in the figures are marked as the bus system.

In an implementation process, the steps in the foregoing methods may be completed by using a hardware integrated logic circuit in the processor or an instruction in a form of software. The steps in the methods with reference to the embodiments may be directly performed and completed through a hardware processor or may be performed and completed through a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information from the memory and completes the steps in the foregoing methods in combination with hardware of the processor. To avoid repetition, details are not described herein again.

It should be understood that the access point 1000 shown in FIG. 10 can implement each process of the access point in the method embodiment in FIG. 2. The operations and/or the functions of the modules in the access point 1000 are intended to implement corresponding procedures in the foregoing method embodiments. For details, refer to the descriptions in the foregoing method embodiments. To avoid repetition, detailed descriptions are properly omitted herein.

Figure 11:
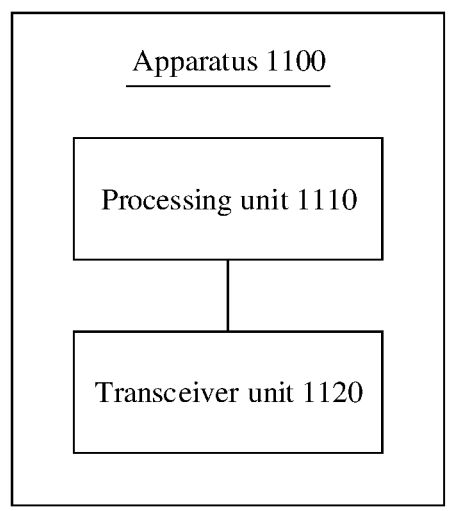
FIG. 11 is a schematic diagram of an apparatus according to another embodiment.

FIG. 11 is a schematic structural diagram of a data scheduling apparatus 1100 according to an embodiment. The apparatus 1100 may include:

a processing unit 1110 and a transceiver unit 1120.

The processing unit 1110 is configured to: control the transceiver unit 1120 to obtain at least one of a plurality of primary channels allocated by an AP, where active access is forbidden on the plurality of primary channels; and receive scheduling of the AP by using the at least one primary channel.

Therefore, in this embodiment, the AP sets the plurality of primary channels in a system bandwidth. The AP allocates at least one of the plurality of primary channels to each of a plurality of STAs, where active access is forbidden on the plurality of primary channels. The STA receives scheduling of the AP by using the at least one primary channel. In this embodiment, the AP sets the plurality of primary channels, so that the AP can flexibly schedule the station by using an idle primary channel. This avoids a problem caused by setting only one primary channel in the prior art, thereby improving data transmission efficiency.

In addition, in this embodiment, the AP may schedule the STAs in a unified manner, so that it is ensured that only uplink transmission or downlink transmission can be performed at a same time, and a conflict caused when both uplink transmission and downlink transmission are performed at the same time can be avoided.

It can be understood that the apparatus 1100 has any function of the station in the method embodiments. Details are not described herein again.

It can be understood that the apparatus in FIG. 11 may be a station or may be a chip or an integrated circuit installed in a station.

Figure 12:
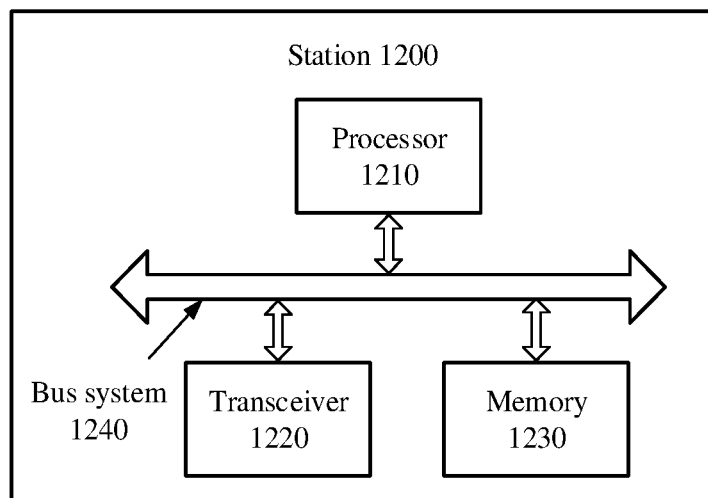
FIG. 12 is a schematic diagram of a station according to an embodiment.

FIG. 12 is a schematic structural diagram of an apparatus on a station side according to an embodiment. As shown in FIG. 12, the apparatus 1200 on the station side may be used in the system shown in FIG. 1, to perform any function of the station in the method embodiments.

As shown in FIG. 12, the apparatus 1200 on the station side may include a processor 1210 and a transceiver 1220. The processor 1210 is connected to the transceiver 1220. Optionally, the apparatus 1200 on the station side further includes a memory 1230, and the memory 1230 is connected to the processor 1210. Further, optionally, the initiating device 1200 may further include a bus system 1240. The processor 1210, the memory 1230, and the transceiver 1220 may be connected by using the bus system 1240. The memory 1230 may be configured to store an instruction. The processor 1210 may correspond to the processing unit 1110, and the transceiver 1220 may correspond to the transceiver unit 1120. Thus, the processor 1210 is configured to execute the instruction to control the transceiver 1220 to send and receive information or signals, and the memory 1230 stores the instruction.

It can be understood that the apparatus 1200 on the station side shown in FIG. 12 can implement each process of the station in the method embodiment in FIG. 2. The operations and/or the functions of the modules in the apparatus 1200 on the station side are intended to implement corresponding procedures in the foregoing method embodiments. For details, refer to the descriptions in the foregoing method embodiments. To avoid repetition, detailed descriptions are properly omitted herein.

An embodiment further provides a processing apparatus. The processing apparatus includes a processor and an interface. The processor is configured to perform the communication method in any one of the foregoing method embodiments.

It can be understood that the processing apparatus may be a chip. For example, the processing apparatus may be an FPGA, an ASIC, a SoC, a CPU, a network processor (NP), a DSP, a micro controller unit (MCU), a programmable logic device (PLD), or another integrated chip.

In an implementation process, the steps in the foregoing methods may be completed by using a hardware integrated logic circuit in the processor or an instruction in a form of software. The steps in the methods with reference to the embodiments may be directly performed and completed through a hardware processor or may be performed and completed through a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware of the processor. To avoid repetition, details are not described herein again.

It can be noted that the processor in the embodiments may be an integrated circuit chip and has a signal processing capability. In an implementation process, the steps in the foregoing method embodiments may be completed by using a hardware integrated logic circuit in the processor or an instruction in a form of software. The foregoing processor may be a general-purpose processor, a digital signal processor DSP, an ASIC, a FPGA or another programmable logic device, a discrete gate or a transistor logic device, or a discrete hardware component. The processor may implement or perform the methods, the steps, and the logical block diagrams that are in the embodiments. The general-purpose processor may be a microprocessor, or the processor may be any conventional processor or the like. The steps in the methods with reference to the embodiments may be directly performed and completed through a hardware decoding processor or may be performed and completed through a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware of the processor.

It may be understood that, in the embodiments, the memory may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example rather than limitative description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It can be noted that the memory of the systems and methods described includes but is not limited to these memories and any memory of another proper type.

An embodiment further provides a communications system. The communications system includes the foregoing access point and station.

An embodiment further provides a computer-readable medium. The computer-readable medium stores a computer program, and when the computer program is executed by a computer, the method in any one of the foregoing method embodiments is implemented.

An embodiment further provides a computer program product. When the computer program product is executed by a computer, the method in any one of the foregoing method embodiments is implemented.

All or some of the foregoing embodiments may be implemented by using software, hardware, firmware, or any combination thereof. When software is used for implementation, all or some of the embodiments may be implemented in a form of computer program product. The computer program product includes one or more computer instructions. When the computer instructions are loaded and executed on a computer, all or some of the procedures or functions according to the embodiments are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It can be understood that the foregoing describes a communication method used in downlink transmission in a communications system. However, the embodiments are not limited thereto. Optionally, a solution similar to one of the foregoing solutions may also be used in uplink transmission. To avoid repetition, details are not described herein again.

The network device and the terminal device in the foregoing apparatus embodiments correspond to the network device and the terminal device in the method embodiments. A corresponding module or unit performs a corresponding step. For example, a sending module (transmitter) performs a sending step in the method embodiments, a receiving module (receiver) performs a receiving step in the method embodiments, and another step than the sending step and the receiving step may be performed by a processing module (processor). For a function of a module, refer to a corresponding method embodiment. The sending module and the receiving module may form a transceiver module, and the transmitter and the receiver may form a transceiver, to jointly implement sending and receiving functions. There may be one or more processors.

In embodiments, "at least one" means one or more, and "a plurality of" means two or more. The term "and/or" describes an association relationship for describing associated objects and represents that three relationships may exist. For example, A and/or B may represent the following cases: only A exists, both A and B exist, and only B exists, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one item (piece) of a, b, or c may indicate: a or b or c, or a and b, or a and c, or b and c, or a, b and c, where a, b, and c may be singular or plural.

It can be understood that "one embodiment" or "an embodiment" mentioned in the embodiments means that particular features, structures, or characteristics related to the embodiment are included in at least one embodiment. Therefore, "in one embodiment" or "in an embodiment" that appears does not necessarily mean a same embodiment. In addition, these particular features, structures, or characteristics may be combined in one or more embodiments in any proper manner. It can be understood that sequence numbers of the foregoing processes do not mean execution sequences in the embodiments. The execution sequences of the processes should be determined based on functions and internal logic of the processes and should not be construed as any limitation on the implementation processes of the embodiments.

Terms such as "component", "module", and "system" are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed by various computer-readable media that store various data structures. For example, the components may communicate by using a local and/or remote process and based on a signal having one or more data packets (for example, data from two components interacting with another component in a local system, a distributed system, and/or across a network such as the Internet interacting with another system by using the signal).

It can be further understood that the first, second, third, fourth, and various numbers included are merely distinguished for convenient description and are not intended to limit the scope of the embodiments.

It can be understood that the term "and/or" describes only an association relationship for describing associated objects and represents that three relationships may exist. For example, A and/or B may represent the following three cases: only A exists, both A and B exist, and only B exists.

A person of ordinary skill in the art may be aware that, in combination with illustrative logical blocks and steps described in the embodiments, the embodiments may be implemented by electronic hardware or a combination of computer software and electronic hardware. Whether the functions are performed by hardware or software depends on particular applications. A person of ordinary skill in the art may use different methods to implement the described functions for each particular application, but it should not be considered that the implementation goes beyond the scope.

A person of ordinary skill in the art may clearly understand that, for the purpose of convenient and brief description, for detailed working processes of the foregoing system, apparatus, and unit, refer to corresponding processes in the foregoing method embodiments. Details are not described herein again.

In the several embodiments, it can be understood that the system, apparatus, and method may be implemented in other manners. For example, the apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, may be located in one position or may be distributed on a plurality of network units. Some or all of the units may be selected based on actual requirements to achieve the objectives of the solutions of the embodiments.

In addition, function units in the embodiments may be integrated into one processing unit, or each of the units may exist alone physically, or two or more units are integrated into one unit.

All or some of the foregoing embodiments may be implemented by using software, hardware, firmware, or any combination thereof. When software is used for implementation, all or some of the embodiments may be implemented in a form of computer program product. The computer program product includes one or more computer instructions (programs). When the computer program instructions are loaded and executed on a computer, all or some of the procedures or functions according to the embodiments are generated. The computer may be a general-purpose computer, a special-purpose computer, a computer network, or another programmable apparatus. The computer instructions may be stored in a non-transitory computer-readable storage medium or may be transmitted from a non-transitory computer-readable storage medium to another non-transitory computer-readable storage medium. For example, the computer instructions may be transmitted from a website, computer, server, or data center to another website, computer, server, or data center in a wired (for example, a coaxial cable, an optical fiber, or a DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

The foregoing descriptions are merely implementations, but are not intended to limit the scope of the embodiments. Any variation or replacement readily figured out by a person of ordinary skill in the art shall fall within the scope of the embodiments.

What is claimed is:

1. A data scheduling method, comprising:
    allocating, by an access point (AP), at least one of a plurality of primary channels to each of a plurality of stations (STAs), wherein active access is forbidden on the plurality of primary channels; and
    synchronously scheduling, by the AP, a STA on a channel comprising at least one idle primary channel, and the at least one idle primary channel is at least one of the plurality of primary channels,
    wherein each of the plurality of primary channels corresponds to one backoff counter,
    after a continuous idle time period of a second primary channel in the plurality of primary channels reaches an AIFS,
    after the second primary channel continues to be idle, a second backoff counter corresponding to the second primary channel is decreased by 1 for each idle slot, and
    when a value of the second backoff counter is 0, the second primary channel is in the idle state, wherein the second primary channel is any one of the plurality of primary channels,
    after a continuous idle time period of a third primary channel in the plurality of primary channels reaches an AIFS,
    after the third primary channel continues to be idle, a third backoff counter corresponding to the third primary channel is decreased by 1 for each idle slot, and
    after a value of the third backoff counter is 0,
    when a value of a fourth backoff counter corresponding to a fourth primary channel in the plurality of primary channels other than the third primary channel is backed off to 0, the fourth primary channel is in the idle state, wherein the third primary channel and the fourth primary channel are any two of the plurality of primary channels.

2. The data scheduling method according to claim 1, wherein the synchronously scheduling, by the AP, of the STA on the channel comprising the at least one idle primary channel further comprises:
    sending, by the AP on the channel comprising the at least one idle primary channel, to the STA allocated to the at least one idle primary channel, one downlink physical protocol data unit (PPDU), or a plurality of downlink PPDUs simultaneously, wherein each PPDU occupies at least one primary channel;
    or
    sending, by the AP on the channel comprising the at least one idle primary channel, to the STA allocated to the at least one idle primary channel, one trigger frame, or a plurality of trigger frames simultaneously, wherein a PPDU in which each trigger frame is located occupies at least one primary channel, and the trigger frame is used to trigger the STA allocated to the at least one idle primary channel to send one uplink PPDU or simultaneously send a plurality of uplink PPDUs; and
    receiving, by the AP, the uplink PPDU, or the plurality of uplink PPDUs simultaneously.

3. The data scheduling method according to claim 2, wherein
    the plurality of primary channels correspond to a plurality of basic service sets (BSSs), and channels of at least two of the plurality of BSSs completely or partially overlap;
    or
    the plurality of primary channels correspond to a same BSS.

4. The data scheduling method according to claim 3, wherein
    when the plurality of primary channels correspond to the plurality of BSSs, some or all of the plurality of BSSs have a same identifier (ID) or a same BSS color, and stations in different BSSs in the some or all BSSs have different identifiers.

5. The data scheduling method according to claim 1, wherein before the synchronously scheduling, by the AP, of the STA on the channel comprising the at least one idle primary channel, the method further comprises:
accepting, by the AP, association performed by the plurality of STAs at least one of:
an uplink orthogonal frequency division multiplexing random access (UORA);
an enhanced distributed channel access (EDCA) within a random contention period allocated by the AP; or
through another AP, wherein the another AP and the AP belong to a same device.

6. The data scheduling method according to claim 1, wherein the plurality of primary channels correspond to one backoff counter, after a continuous idle time period of a first primary channel in the plurality of primary channels reaches an arbitration interframe space (AIFS),
after the first primary channel continues to be idle, the backoff counter is decreased by 1 for each idle slot, and
when a value of the backoff counter is 0, the first primary channel is in an idle state, wherein the first primary channel is any one of the plurality of primary channels.

7. The data scheduling method according to claim 6, further comprising:
when the AP sends, on the channel comprising the at least one idle primary channel, N pieces of data to the STA allocated to the at least one idle primary channel,
after at least one piece of data is successfully sent, updating, by the AP, a window value of the backoff counter to a preset minimum window value, or
after all the N pieces of data fail to be sent, updating, by the AP, a window value of the backoff counter to a smaller one of a preset maximum window value and a value twice a current window value plus 1, wherein the data is the downlink PPDU or the trigger frame, and N is an integer greater than or equal to 1.

8. The data scheduling method according to claim 1, further comprising:
when the AP sends, on the channel comprising the at least one idle primary channel, N pieces of data to the STA allocated to the at least one idle primary channel,
after at least one piece of data is successfully sent, updating, by the AP, a window value of a backoff counter corresponding to a primary channel occupied by the N pieces of data to a preset minimum window value, or
after all the N pieces of data fail to be sent, updating, by the AP, a window value of a backoff counter corresponding to a primary channel occupied by the N pieces of data to a smaller one of a preset maximum window value and a value twice a current window value plus 1, wherein the data is the downlink PPDU or the trigger frame, and N is an integer greater than or equal to 1;
or
when the AP sends, on the channel comprising the at least one idle primary channel, N pieces of data to the STA allocated to the at least one idle primary channel,
after at least one piece of data is successfully sent, updating, by the AP, a window value of a backoff counter corresponding to a primary channel occupied by the N pieces of data to a preset minimum window value, or
after all the N pieces of data fail to be sent, updating, by the AP, a window value of a backoff counter whose value is 0 and that corresponds to a primary channel occupied by the N pieces of data to a smaller one of a preset maximum window value and a value twice a current window value plus 1, wherein the data is the downlink PPDU or the trigger frame, and N is an integer greater than or equal to 1;
or
when the AP sends, on the channel comprising the at least one idle primary channel, N pieces of data to the STA allocated to the at least one idle primary channel,
after at least one piece of data is successfully sent, updating, by the AP, a window value of a backoff counter whose value is 0 and that corresponds to a primary channel occupied by the N pieces of data to a preset minimum window value, or
after all the N pieces of data fail to be sent, updating, by the AP, a window value of a backoff counter whose value is 0 and that corresponds to a primary channel occupied by the N pieces of data to a smaller one of a preset maximum window value and a value twice a current window value plus 1, wherein the data is the downlink PPDU or the trigger frame, and N is an integer greater than or equal to 1;
or
when the AP sends, on the channel comprising the at least one idle primary channel, N pieces of data to the STA allocated to the at least one idle primary channel,
after at least one piece of data is successfully sent, updating, by the AP, a window value of a backoff counter whose value is 0 and that corresponds to a primary channel occupied by the N pieces of data to a preset minimum window value, or
after all the N pieces of data fail to be sent, updating, by the AP, a window value of a backoff counter corresponding to a primary channel occupied by the N pieces of data to a smaller one of a preset maximum window value and a value twice a current window value plus 1, wherein the data is the downlink PPDU or the trigger frame, and N is an integer greater than or equal to 1.

9. The data scheduling method according to claim 1, wherein
a maximum bandwidth corresponding to each of the plurality of primary channels is a maximum bandwidth supported by the AP.

10. A data scheduling method, comprising:
obtaining, by a station (STA), at least one of a plurality of primary channels allocated by an access point (AP), wherein active access is forbidden on the plurality of primary channels; and
receiving, by the STA, synchronous scheduling of the AP by using the at least one primary channel,
wherein each of the plurality of primary channels corresponds to one backoff counter,
after a continuous idle time period of a second primary channel in the plurality of primary channels reaches an AIFS,
after the second primary channel continues to be idle, a second backoff counter corresponding to the second primary channel is decreased by 1 for each idle slot, and
when a value of the second backoff counter is 0, the second primary channel is in the idle state, wherein the second primary channel is any one of the plurality of primary channels, after a continuous idle time period of a third primary channel in the plurality of primary channels reaches an AIFS, after the third primary channel continues to be idle, a third backoff counter corresponding to the third primary channel is decreased by 1 for each idle slot, and after a value of the third backoff counter is 0, when a value of a fourth backoff counter corresponding to a fourth primary channel in the plurality of primary channels other than the third primary channel is backed off to 0, the fourth primary channel is in the idle state, wherein the third primary channel and the fourth primary channel are any two of the plurality of primary channels.

11. The data scheduling method according to claim 10, wherein the receiving, by the STA, the scheduling of the AP by using the at least one primary channel further comprises:

receiving, by the STA by using the at least one primary channel, one downlink physical protocol data unit (PPDU) sent by the AP or a plurality of downlink PPDUs simultaneously sent by the AP, wherein each PPDU occupies at least one primary channel; or receiving, by the STA by using the at least one primary channel, one trigger frame sent by the AP or a plurality of trigger frames simultaneously sent by the AP, wherein a PPDU in which each trigger frame is located occupies at least one primary channel, and the trigger frame is used to trigger the STA to send one uplink PPDU or simultaneously send a plurality of uplink PPDUs; and sending, by the STA to the AP, the uplink PPDU, or the plurality of uplink PPDUs simultaneously.

12. The data scheduling method according to claim 11, wherein the plurality of primary channels correspond to a plurality of basic service sets (BSSs), and channels of at least two of the plurality of BSSs completely or partially overlap; or the plurality of primary channels correspond to a same BSS.

13. The method according to claim 12, wherein when the plurality of primary channels correspond to the plurality of BSSs, some or all of the plurality of BSSs have a same identifier (ID) or a same BSS color, and stations in different BSSs in the some or all BSSs have different identifiers.

14. The data scheduling method according to claim 10, wherein before the receiving, by the STA, the scheduling of the AP by using the at least one primary channel, the method further comprises:

associating with, by the STA, the AP at least one of:

an uplink orthogonal frequency division multiplexing random access (UORA);

an enhanced distributed channel access (EDCA) within a random contention period allocated by the AP; or through another AP, wherein the another AP and the AP belong to a same device.

15. The data scheduling method according to claim 10, wherein a maximum bandwidth corresponding to each of the plurality of primary channels is a maximum bandwidth supported by the AP.

16. A data scheduling apparatus, comprising a processor and a memory, wherein the memory stores program code, and the processor invokes the program code stored in the memory to execute the following operations:

allocating, at least one of a plurality of primary channels to each of a plurality of stations (STAs), wherein active access is forbidden on the plurality of primary channels; and synchronously scheduling a STA on a channel comprising at least one idle primary channel, and the at least one idle primary channel is at least one of the plurality of primary channels, wherein each of the plurality of primary channels corresponds to one backoff counter, after a continuous idle time period of a second primary channel in the plurality of primary channels reaches an AIFS, after the second primary channel continues to be idle, a second backoff counter corresponding to the second primary channel is decreased by 1 for each idle slot, and when a value of the second backoff counter is 0, the second primary channel is in the idle state, wherein the second primary channel is any one of the plurality of primary channels, after a continuous idle time period of a third primary channel in the plurality of primary channels reaches an AIFS, after the third primary channel continues to be idle, a third backoff counter corresponding to the third primary channel is decreased by 1 for each idle slot, and after a value of the third backoff counter is 0, when a value of a fourth backoff counter corresponding to a fourth primary channel in the plurality of primary channels other than the third primary channel is backed off to 0, the fourth primary channel is in the idle state, wherein the third primary channel and the fourth primary channel are any two of the plurality of primary channels.

17. The data scheduling apparatus according to claim 16, wherein synchronously scheduling of the STA on the channel comprising the at least one idle primary channel further comprises:

sending on the channel comprising the at least one idle primary channel, to the STA allocated to the at least one idle primary channel, one downlink physical protocol data unit (PPDU), or a plurality of downlink PPDUs simultaneously, wherein each PPDU occupies at least one primary channel; or sending on the channel comprising the at least one idle primary channel, to the STA allocated to the at least one idle primary channel, one trigger frame, or a plurality of trigger frames simultaneously, wherein a PPDU in which each trigger frame is located occupies at least one primary channel, and the trigger frame is used to trigger the STA allocated to the at least one idle primary channel to send one uplink PPDU or simultaneously send a plurality of uplink PPDUs; and receiving the uplink PPDU, or the plurality of uplink PPDUs simultaneously.

18. The data scheduling apparatus according to claim 16, wherein before the synchronously scheduling of the STA on the channel comprising the at least one idle primary channel, the operations further comprise:

accepting association performed by the plurality of STAs at least one of:

an uplink orthogonal frequency division multiplexing random access (UORA);

an enhanced distributed channel access (EDCA) within a random contention period allocated by the AP; or through another AP, wherein the another AP and the AP belong to a same device.

* * * * *